(12) United States Patent
Bockheim et al.

(10) Patent No.: US 7,551,432 B1
(45) Date of Patent: Jun. 23, 2009

(54) MONITOR STAND

(75) Inventors: Robert J Bockheim, Grand Rapids, MI (US); Michael Fedrigo, Comstock Park, MI (US); Robert J Surman, East Grand Rapids, MI (US); Matthew O Schad, Ada, MI (US); Aaron DeJule, Chicago, IL (US)

(73) Assignee: Nucraft Furniture Company, Comstock Park, MI (US)

( * ) Notice: Subject to any disclaimer, the term of this patent is extended or adjusted under 35 U.S.C. 154(b) by 240 days.

(21) Appl. No.: 11/592,390

(22) Filed: Nov. 3, 2006

Related U.S. Application Data

(60) Provisional application No. 60/735,623, filed on Nov. 10, 2005.

(51) Int. Cl.
*G06F 1/16* (2006.01)
(52) U.S. Cl. ....................................... 361/681
(58) Field of Classification Search ................ 361/681, 361/682, 683, 724–727; 248/917; 381/306, 381/333; 345/169, 905; 312/223.1, 223.2
See application file for complete search history.

(56) References Cited

U.S. PATENT DOCUMENTS

| | | | |
|---|---|---|---|
| 5,088,676 A | 2/1992 | Orchard et al. | |
| 5,799,917 A | 9/1998 | Li | |
| 5,947,429 A | 9/1999 | Sweere et al. | |
| 5,975,472 A | 11/1999 | Hung | |
| 6,012,693 A | 1/2000 | Voeller et al. | |
| 6,019,332 A | 2/2000 | Sweere et al. | |
| 6,233,139 B1 | 5/2001 | Hamon | |
| 6,394,403 B1 | 5/2002 | Hung | |
| 6,402,109 B1 | 6/2002 | Dittmer | |
| D474,162 S | 5/2003 | Kubota | |
| D496,363 S | 9/2004 | Ozolins et al. | |
| D497,166 S | 10/2004 | Vick | |
| 6,807,051 B2 * | 10/2004 | Takahashi | 361/681 |
| 6,857,610 B1 | 2/2005 | Conner et al. | |
| 2003/0128503 A1 | 7/2003 | Takahashi | |
| 2006/0016941 A1 * | 1/2006 | Choi et al. | 248/122.1 |
| 2006/0290812 A1 * | 12/2006 | Hsu | 348/552 |

* cited by examiner

*Primary Examiner*—Chandrika Prasad
(74) *Attorney, Agent, or Firm*—Van Dyke, Gardner, Linn & Burkhart LLP

(57) ABSTRACT

A monitor stand for supporting a computer monitor includes a base having a base portion and a support arm extending upward from the base portion, and a support panel attached to the support arm. The support panel may comprise a curved panel having a curved front surface, and the support panel may support a computer monitor at the curved front surface. The monitor stand may include a bracket assembly for attaching the computer monitor to the support panel, such as via a tongue and groove configuration. The monitor stand may include including at least one storage shelf extending from a rear surface of the support panel, and may have housing that substantially encases the storage shelf. The support panel may include an aperture for routing wires or cables of the computer monitor, and the support arm may include a passageway for routing wires or cables of the computer monitor.

23 Claims, 22 Drawing Sheets

MONITOR STAND

CROSS REFERENCE TO RELATED APPLICATION

The present application claims the benefit of U.S. provisional application Ser. No. 60/735,623, filed Nov. 10, 2005, which is hereby incorporated herein by reference in its entirety.

FIELD OF THE INVENTION

The present invention relates generally to computer display screens or monitors and, more particularly, to a support or stand for supporting a computer monitor.

BACKGROUND OF THE INVENTION

It is known in the art to provide a monitor or display screen for use with a personal computer. With increasing frequency, conventional CRT monitors are being replaced with flat LCD display monitors. However, there is a tendency to place these smaller scale flat LCD monitors on the corner of a desk, leaving unused space behind the monitors.

SUMMARY OF THE INVENTION

The present invention provides a monitor support or stand for supporting a computer monitor, such as an LCD flat panel monitor or the like. The monitor stand provides an aesthetically pleasing support panel or backdrop for the monitor to enhance the appearance of the monitor and stand. The monitor stand may include accessory storage or support options at its rearward side for supporting various accessories or devices or computers or the like behind the support panel, so as to utilize the space behind the monitor that is often wasted when a computer monitor is placed at a desk or countertop or credenza or the like.

According to an aspect of the present invention, a monitor stand for supporting a computer monitor includes a base, which includes a base portion and a support arm extending upward from the base portion, and a support panel attached to the support arm. The support panel comprises a curved panel having a curved front surface. The support panel is configured to support a computer monitor at the curved front surface of the support panel.

The monitor stand may include a bracket assembly for attaching the computer monitor to the support panel. The bracket assembly may comprise a panel attachment portion that is secured to the support panel and a monitor attachment portion that is secured to a computer monitor, with the monitor attachment portion preferably attaching to the panel attachment portion without fasteners. Optionally, the panel attachment portion and the monitor attachment portion may engage one another or slide together via a tongue and groove configuration to attach (and preferably removably or detachably attach) the monitor attachment portion to the panel attachment portion.

The monitor stand may include at least one storage shelf extending from a rear surface of the support panel. The storage shelf may be configured to support a CPU or a laptop computer thereon, and/or may be positioned within a housing that substantially encases the storage shelf.

Optionally, and desirably, the support panel may include or provide at least one aperture or opening therethrough for routing wires or cables of the computer monitor. Optionally, and desirably, the support arm may include at least one passageway therethrough for routing wires or cables of the computer monitor.

Therefore, the present invention provides a monitor stand that supports a computer monitor and provides a finished framing around and behind the monitor. The monitor stand may provide a curved support panel for supporting and framing the monitor at the monitor stand. The monitor stand of the present invention may include one or more shelves or recesses or cavities for supporting or storing one or more other accessories or devices or items at the monitor stand, while still providing the desired finished appearance of the monitor and monitor stand. The monitor stand of the present invention thus may be highly suited for executive offices or lobbies or home environments, where the monitor stand provides an aesthetically pleasing monitor stand while providing functional features for supporting or docking various accessories typically associated with a computer monitor or desk or workstation.

These and other objects, advantages, purposes and features of the present invention will become apparent upon review of the following specification in conjunction with the drawings.

DESCRIPTION OF THE PREFERRED EMBODIMENTS

Figure 1:
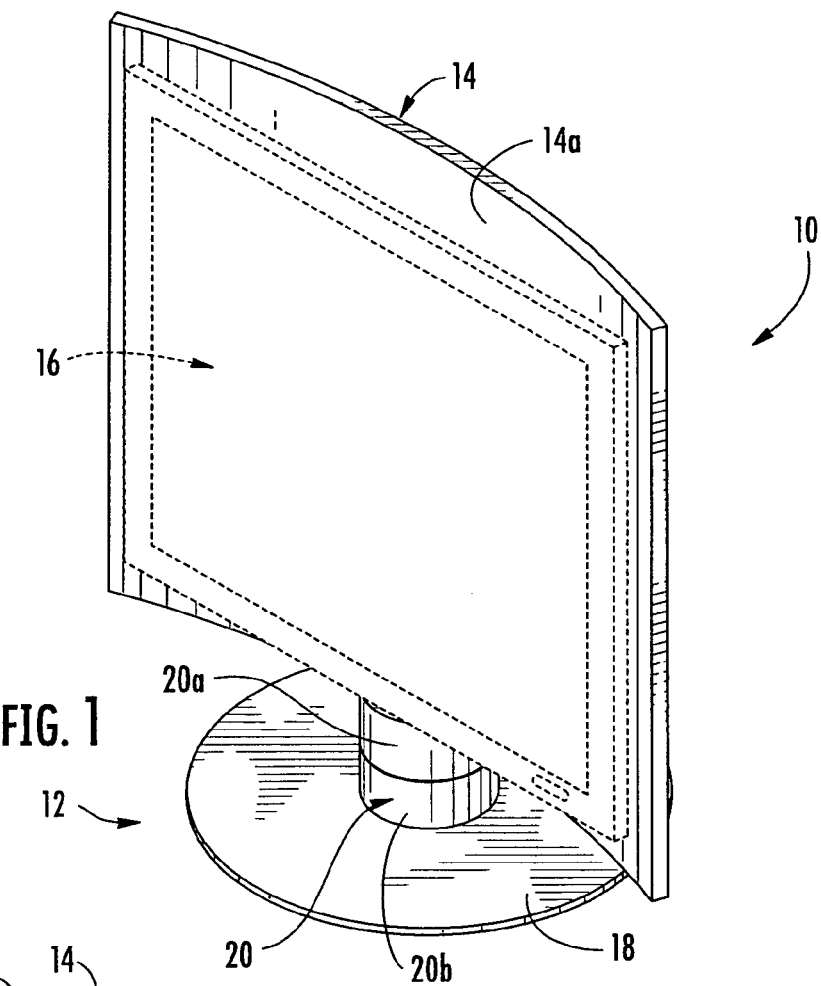
FIG. 1 is a front perspective view of a monitor stand in accordance with the present invention.
Figure 2:
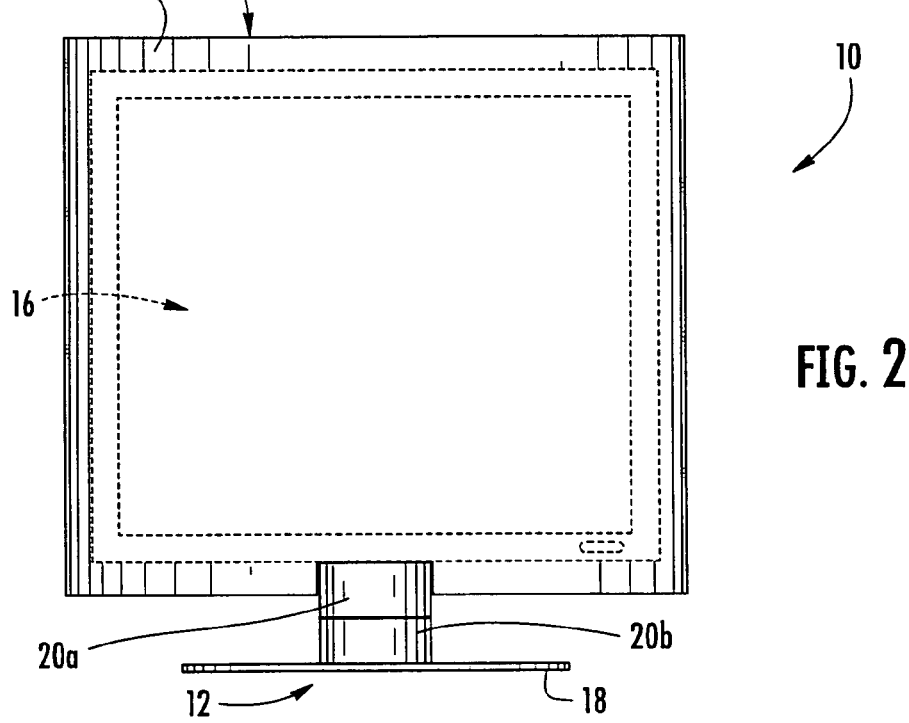
FIG. 2 is a front elevation of the monitor stand of FIG. 1.

Referring now to the drawings and the illustrative embodiments depicted therein, a display support or monitor support or monitor stand 10 includes a base or base portion 12 and a support panel 14 supported by base 12 (FIGS. 1-17). Monitor stand or support 10 is configured to support a computer monitor or screen or display 16 at support panel 14 to provide an aesthetically pleasing appearance to the monitor. The support panel 14 may comprise a curved support panel and may support or removably support the monitor, such as a flat screen monitor thereon, as discussed below. Optionally, the monitor stand may support other objects or accessories or computer components, as also discussed below.

Base 12 of monitor stand 10 is configured to rest on a flat or substantially flat or planar support surface, such as on a desktop or cabinet top or the like. In the illustrated embodiment, base 12 provides a large base or disc portion 18 and a generally vertically extending support arm or stem or post 20 extending upwardly therefrom. Preferably, support arm 20 is pivotable about a generally vertical pivot axis relative to base portion 18. For example, an upper arm portion 20a may pivot relative to a lower arm portion 20b (which may be generally fixed relative to base portion 18) to provide pivotal movement of the support panel 14 and monitor 16 relative to base portion 18, as discussed below. In the illustrated embodiment, the upper arm portion 20a pivotally receives lower arm portion 20b therein and is rotatable or pivotable about the lower arm portion for adjusting the support panel 14 relative to the base portion 18 of base 12.

Support arm 20 may comprise a generally hollow support arm to provide for wire management for the wires or cables of the monitor mounted on monitor stand or display support 10, as also discussed below. For example, the lower arm portion 20b may include an aperture or opening 21 (FIGS. 4, 6, 7 and 9) for routing wires or cables out of the lower end of the support arm. In the illustrated embodiment, the support arm and base portion comprise metallic materials, but other materials, such as polymeric materials or the like, may be utilized while remaining within the spirit and scope of the present invention.

As shown in FIGS. 8, 9, 13, 15 and 16, upper arm portion 20a may be cut or formed to have a semi-cylindrical portion 20c at its upper end so that the front surface 12a of support panel 14 may be generally flush with the front edges of the semi-cylindrical portion 20c of upper arm portion 20a. The semi-cylindrical portion may be closed or covered along its front and at the upper end of the cylindrical portion to provide an enclosed passageway through the arm portion, or the semi-cylindrical portion may be open to facilitate access to the passageway, while remaining within the spirit and scope of the present invention.

Figure 13:
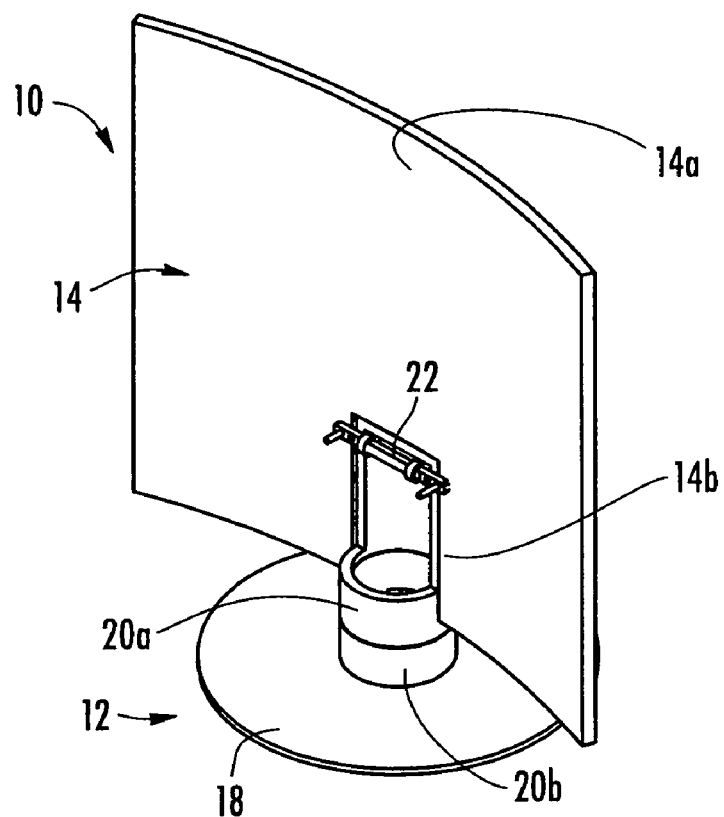
FIG. 13 is another perspective view of a monitor stand similar to FIG. 12, shown without a flat panel monitor supported thereon.
Figure 14:
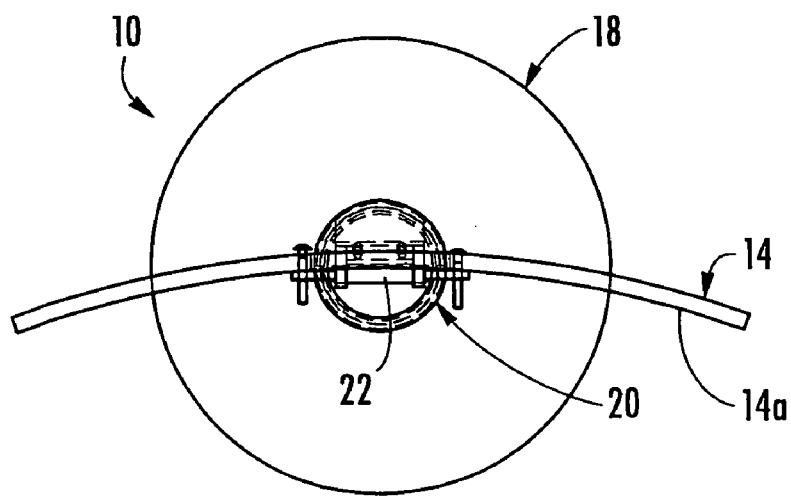
FIG. 14 is a top plan view of the monitor stand of FIG. 13.
Figure 15:
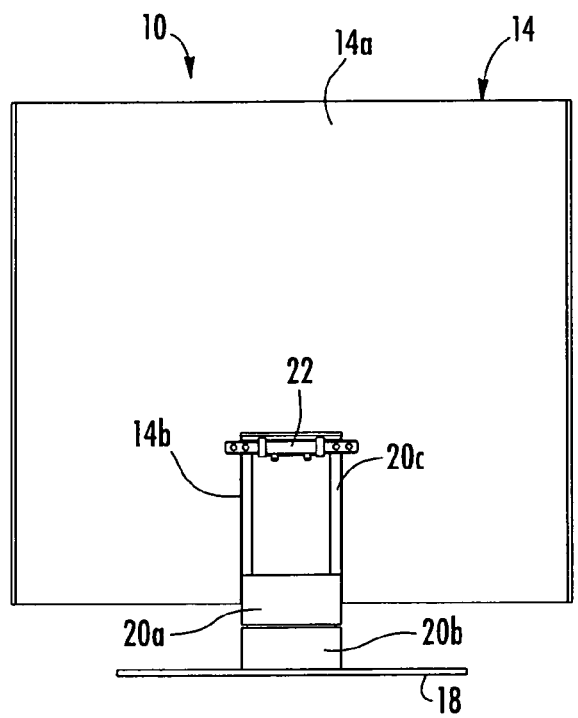
FIG. 15 is a front elevation of the monitor stand of FIGS. 13-14.
Figure 16:
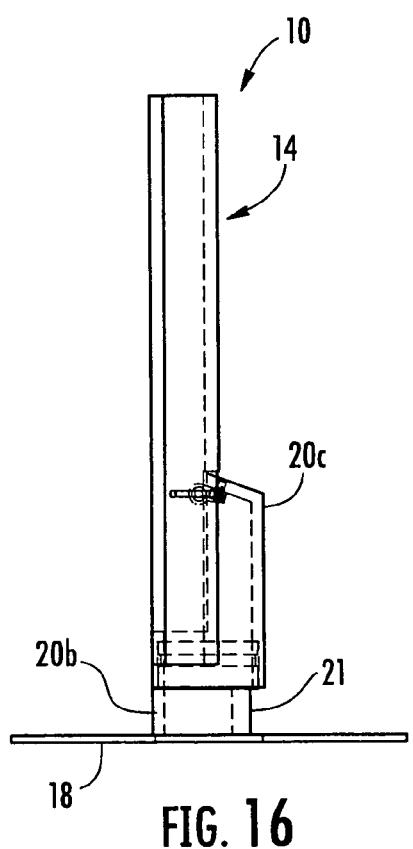
FIG. 16 is a side elevation of the monitor stand of FIGS. 13-15.
Figure 17:
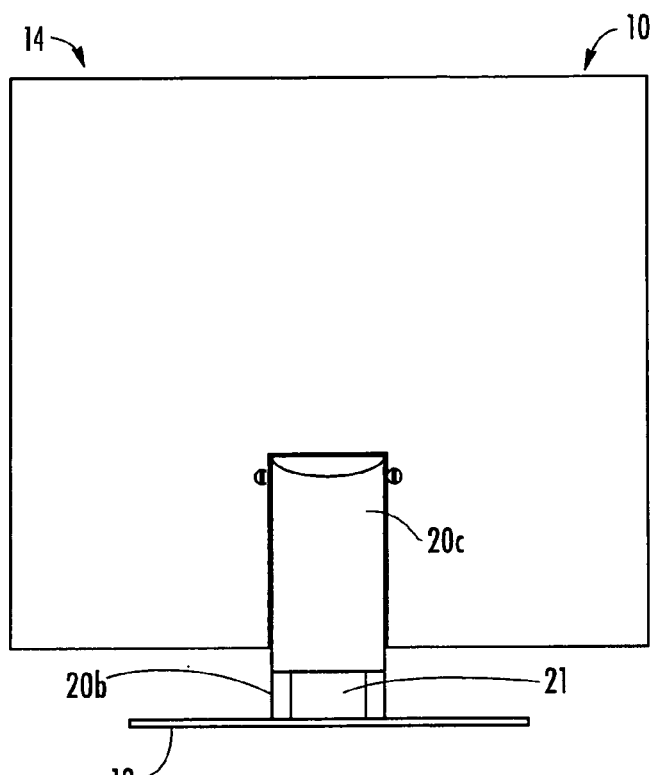
FIG. 17 is a rear elevation of the monitor stand of FIGS. 13-16.
Figure 18:
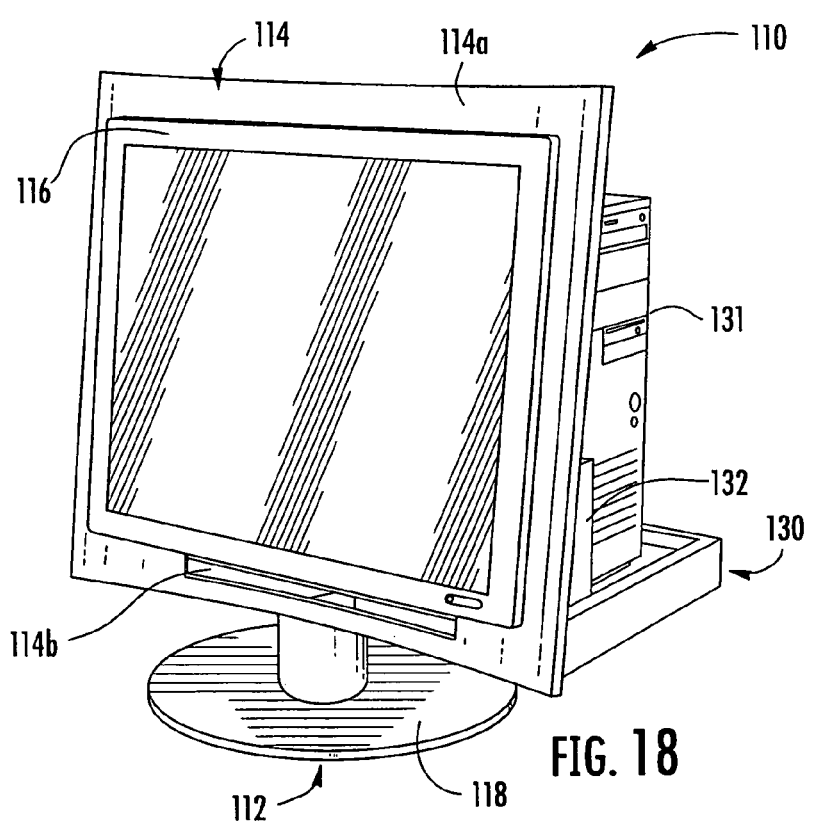
FIG. 18 is a front perspective view of another monitor stand of the present invention, shown supporting a flat panel monitor at a display portion and supporting a computer at a rear portion of the monitor stand.
Figure 19A:
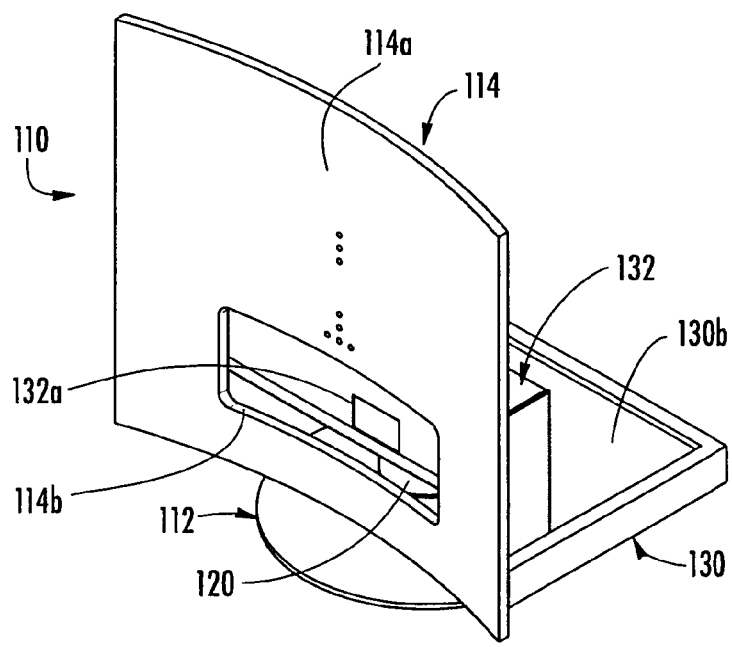
FIG. 19A is another front perspective view of a monitor stand similar to FIG. 18, shown without a flat panel monitor or computer supported thereon.
Figure 19B:
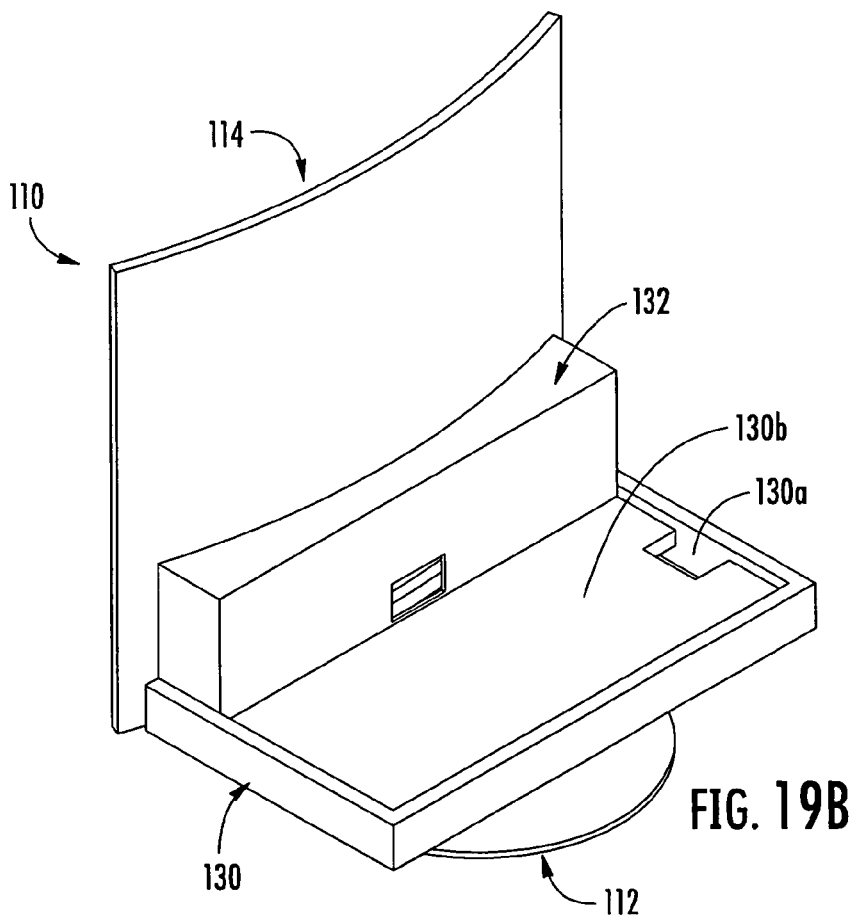
FIG. 19B is a rear perspective view of the monitor stand of FIG. 19A.
Figure 20:
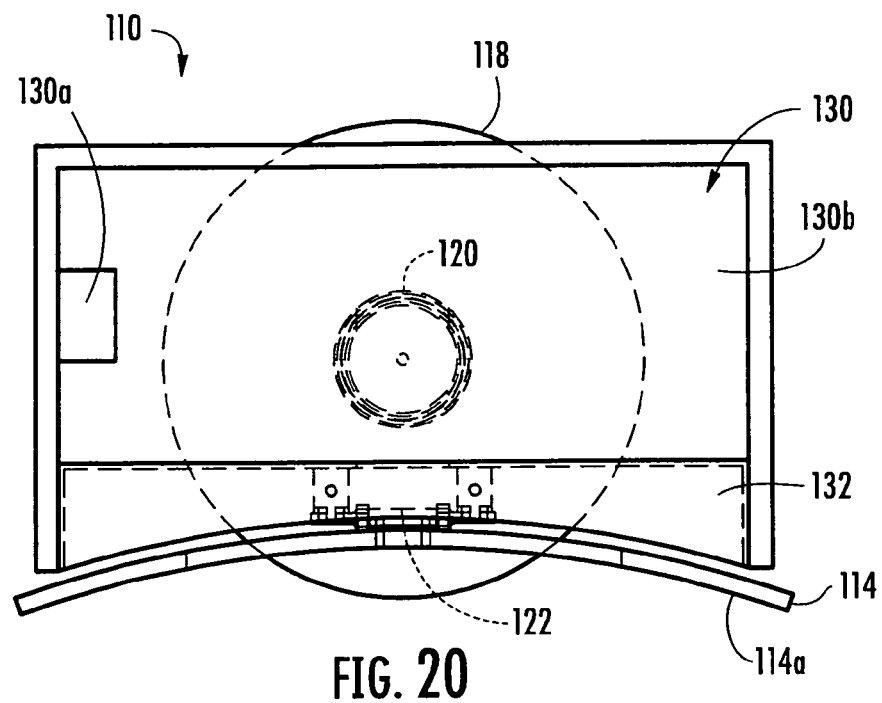
FIG. 20 is a top plan view of the monitor stand of FIGS. 19A and 19B.
Figure 21:
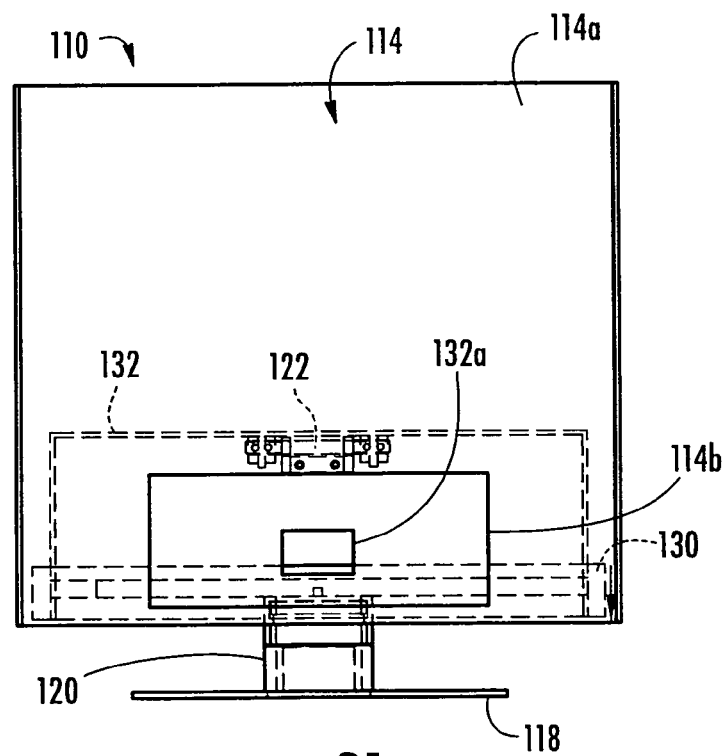
FIG. 21 is a front elevation of the monitor stand of FIGS. 19-20.
Figure 22:
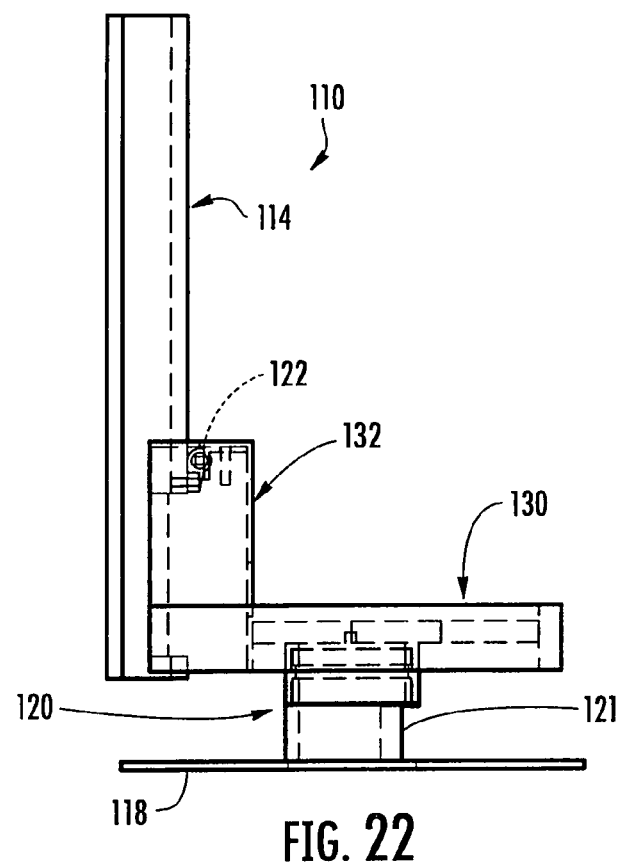
FIG. 22 is a side elevation of the monitor stand of FIGS. 19-21.
Figure 23:
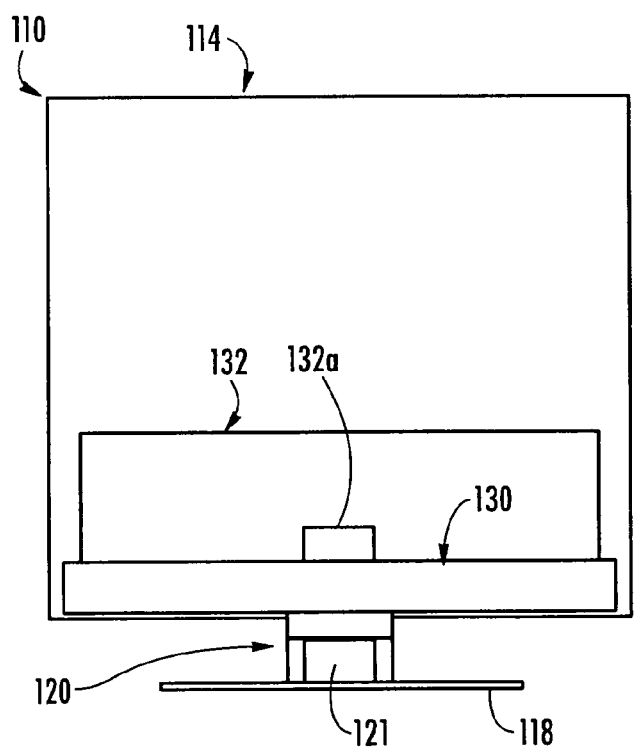
FIG. 23 is a rear elevation of the monitor stand of FIGS. 19-22.
Figure 24:
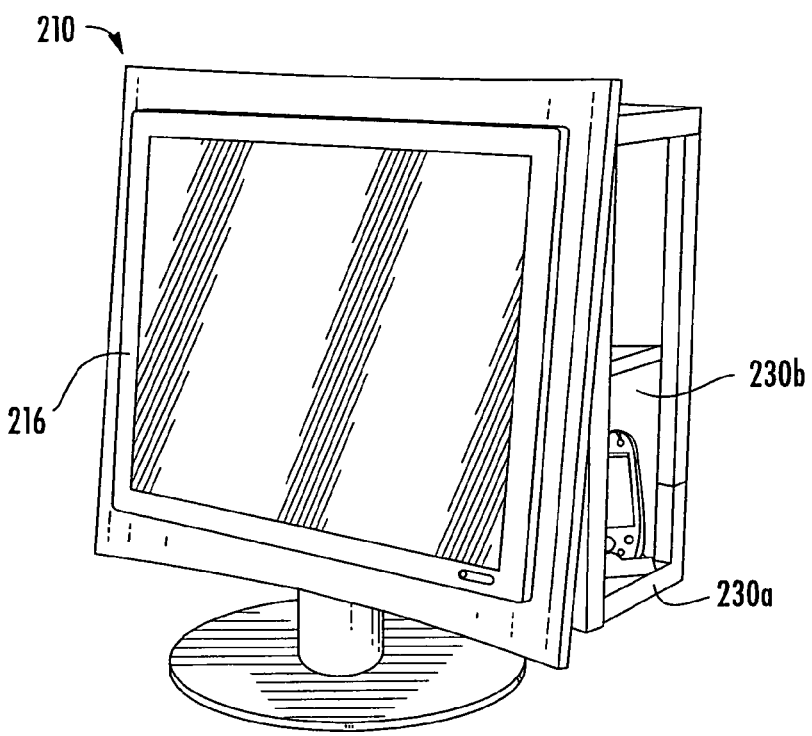
FIG. 24 is a front perspective view of another monitor stand of the present invention, shown supporting a flat panel monitor at a display portion and providing storage capabilities at a rear portion of the monitor stand.

The support panel 14 may be pivotally mounted to the upper end of upper arm portion 20a, such as via a hinge or pivot axis or bracket 22 (FIGS. 8 and 13-17), to allow for pivotal adjustment of the support panel 14 about a generally horizontal pivot axis with respect to base 12. The hinge or pivot axis or element 22 may comprise any suitable pivot element, and may be biased or spring-loaded so as to be biased toward a default orientation of the display panel, whereby a user may push or adjust the display panel to move or adjust the display panel to a desired orientation. Optionally, the hinge or pivot element may substantially retain (such as via frictional engagement of the hinge elements or via detents or the like) the monitor at the desired angle or orientation and thus may resist or limit movement of the monitor about the horizontal pivot axis to limit or substantially preclude unintentional movement of the monitor about the horizontal pivot axis. As shown in FIG. 13, support panel 14 includes a notch or cut out 14b at its lower end or region for receiving the upper portion 20c of the support arm 20 to allow for pivotal movement of the support panel 14 at the hinge 22 without interference between the support arm 20 and the support panel 14.

As best shown in FIGS. 1, 3, 5, 13 and 14, support panel 14 is preferably a curved or arcuate panel that is curved so as to have a concave front surface 14a. Preferably, the curved support panel 14 comprises wood, such as a stained or painted wood panel that provides the desired appearance to the display support or monitor stand. For example, the support panel material and/or color may be selected to substantially match or contrast or coordinate with the desk or cabinet or countertop at which it is positioned. Optionally, however, the support panel may be generally planar shaped and/or may be formed of other materials, such as metal or polymeric materials or the like, depending on the desired appearance of the monitor stand, without affecting the scope of the present invention. Optionally, the support panel may be selected or designed by the user to provide the desired personalized or customized appearance of the monitor and monitor stand, such as by selecting a desired color or material or texture or the like of the panel and/or the base portion. The support panel and monitor stand or support thus provides an aesthetically pleasing frame around the monitor to enhance the appearance of the monitor at the desk or cabinet or counter top or work station at which it is positioned.

Figure 3:
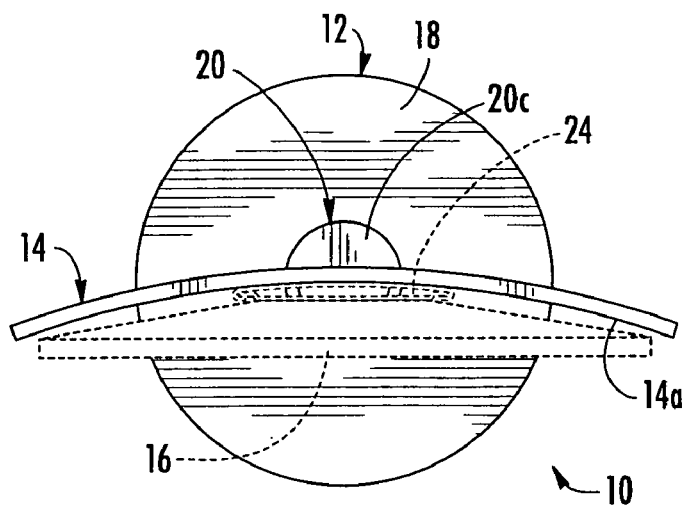
FIG. 3 is a top plan view of the monitor stand of FIGS. 1 and 2.
Figure 4:
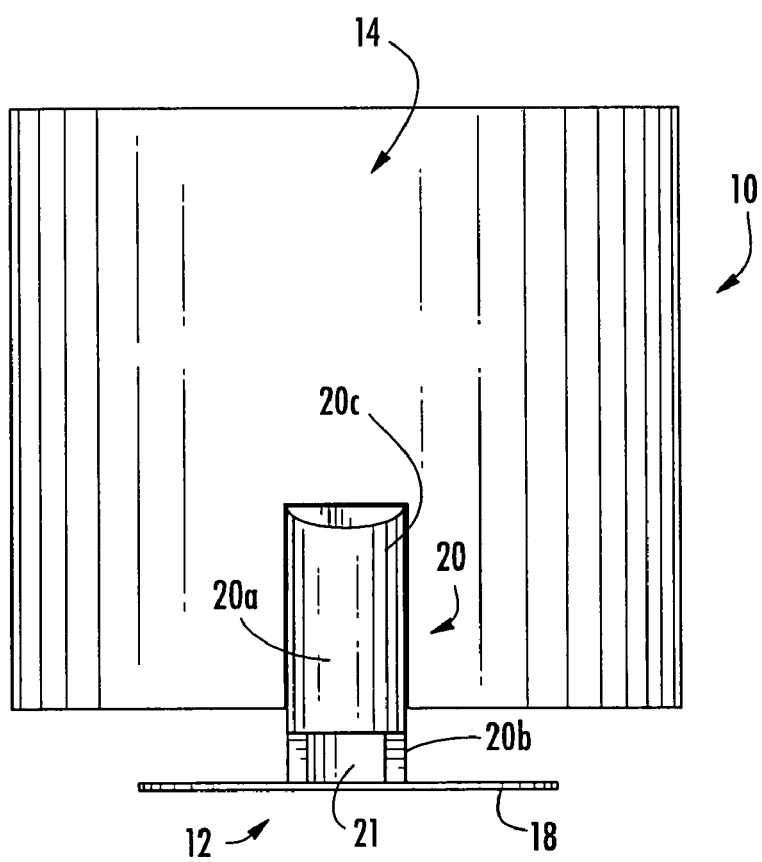
FIG. 4 is a rear elevation of the monitor stand of FIGS. 1-3.
Figure 5:
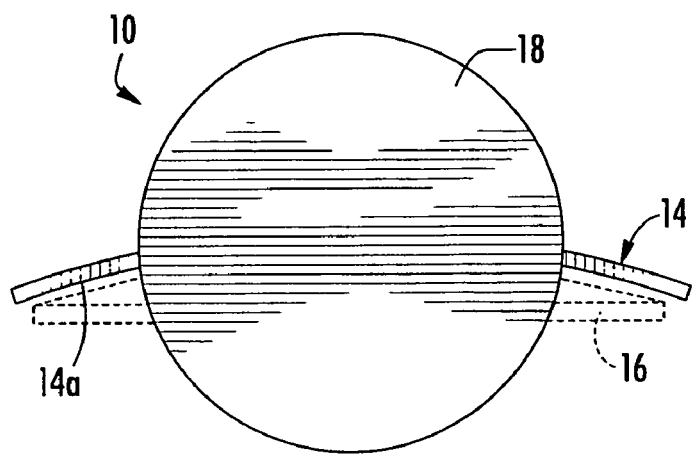
FIG. 5 is a bottom plan view of the monitor stand of FIGS. 1-4.
Figure 6:
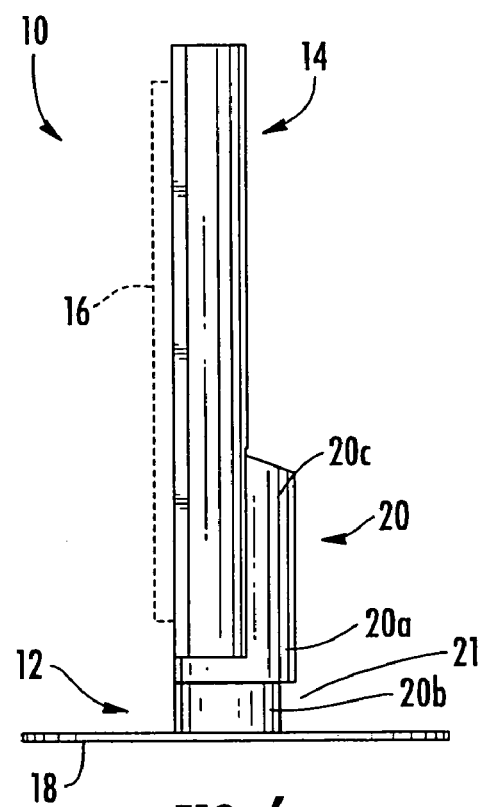
FIG. 6 is a side elevation of the monitor stand of FIGS. 1-5.
Figure 7:
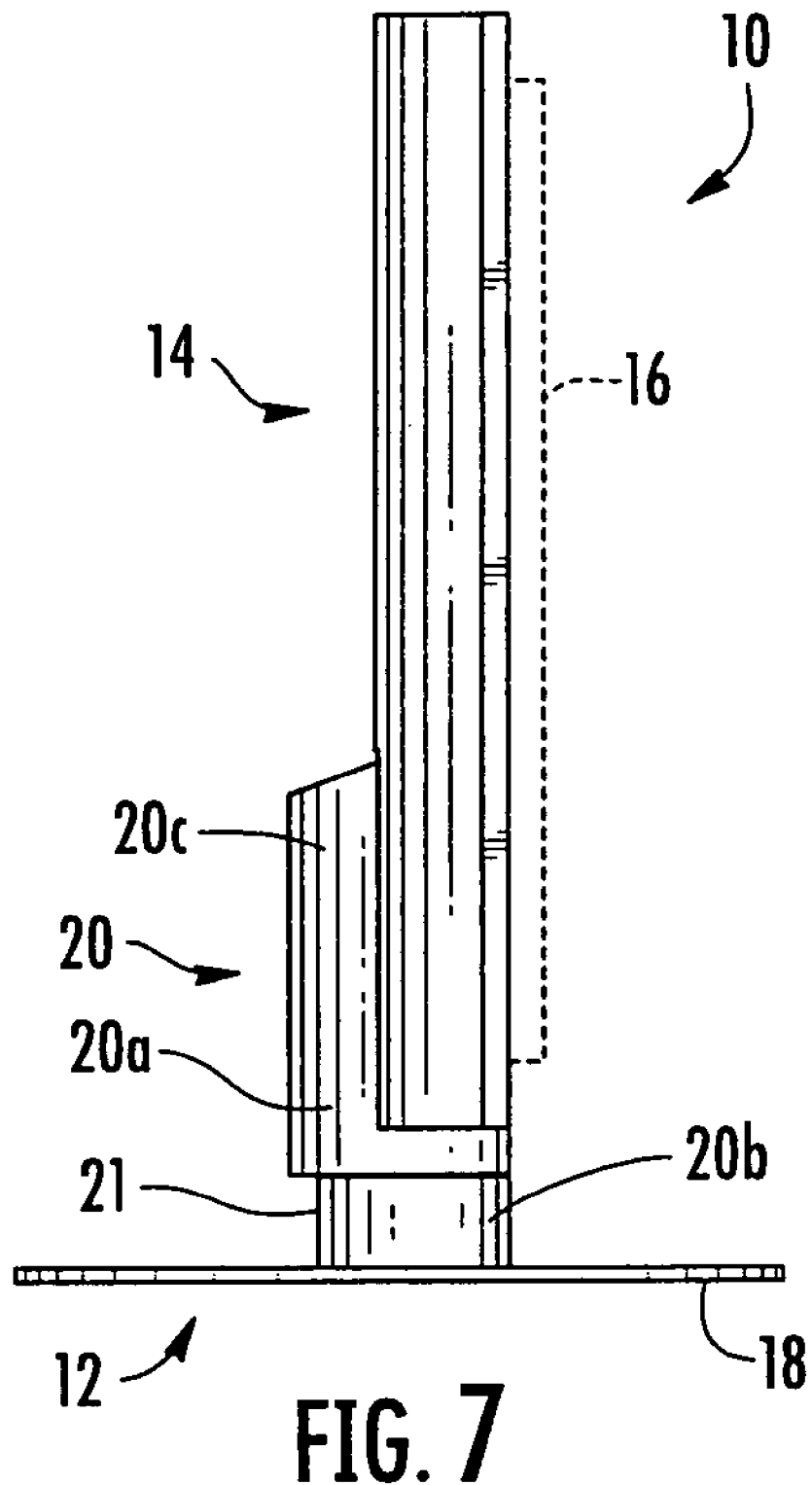
FIG. 7 is an opposite side elevation of the monitor stand of FIGS. 1-6.
Figure 8:
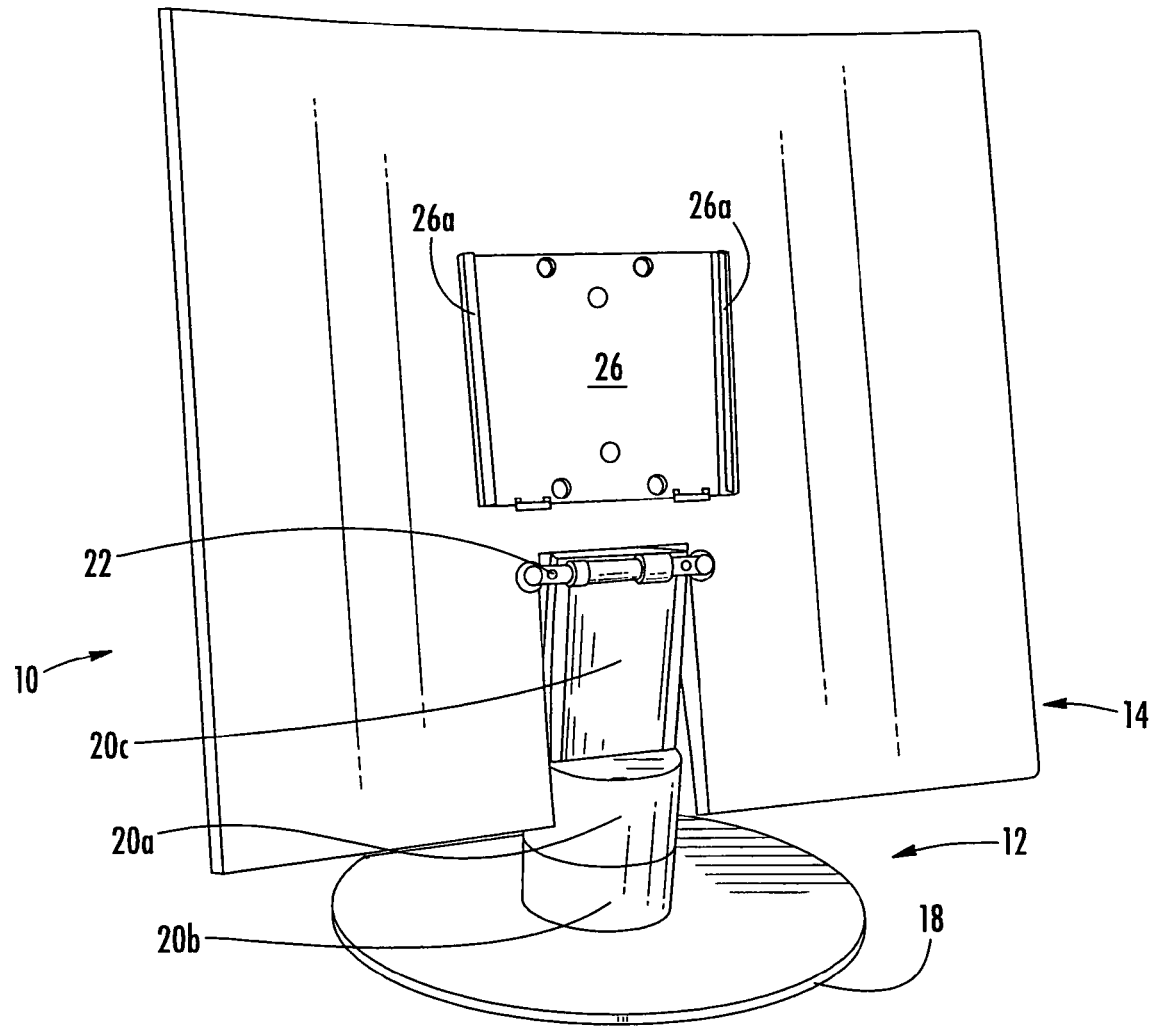
FIG. 8 is a front perspective view of a monitor stand of the present invention, showing a panel attachment portion of a mounting bracket attached to the support panel.
Figure 9:
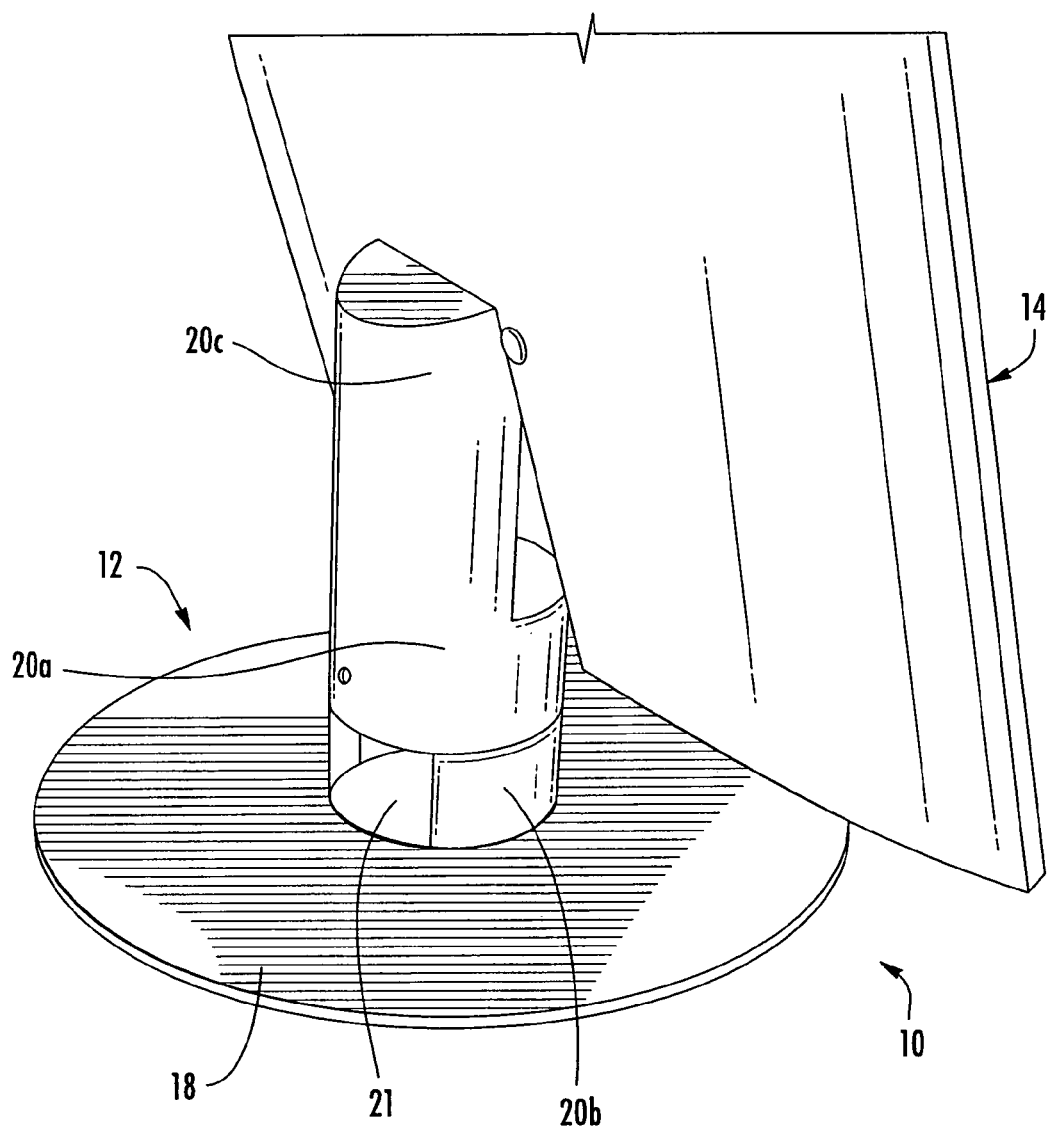
FIG. 9 is a side perspective view of the monitor stand, showing a wire management opening at the lower end of the support arm.
Figure 10:
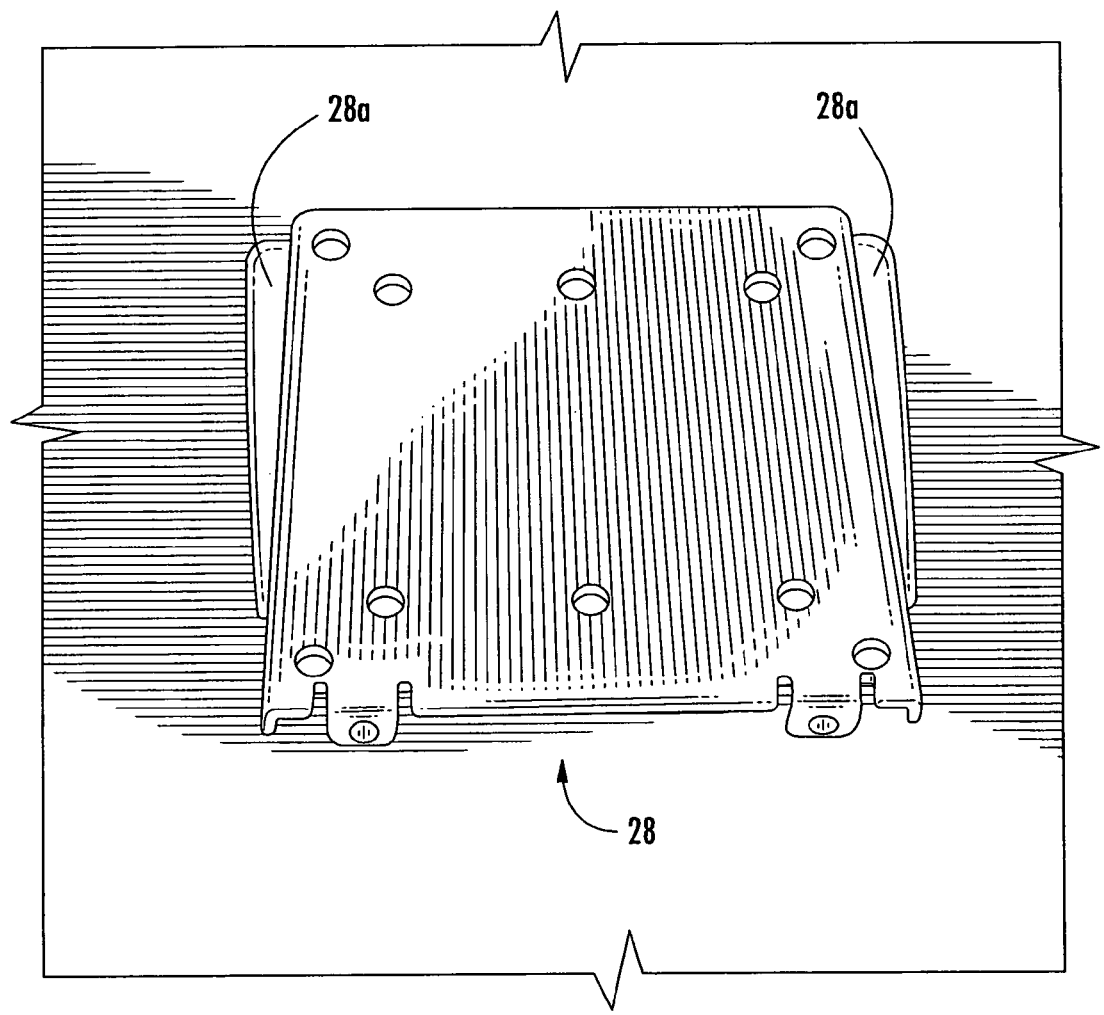
FIG. 10 is a perspective view of a monitor attachment portion of the mounting bracket for mounting to the rear of a typical flat panel monitor.
Figure 11:
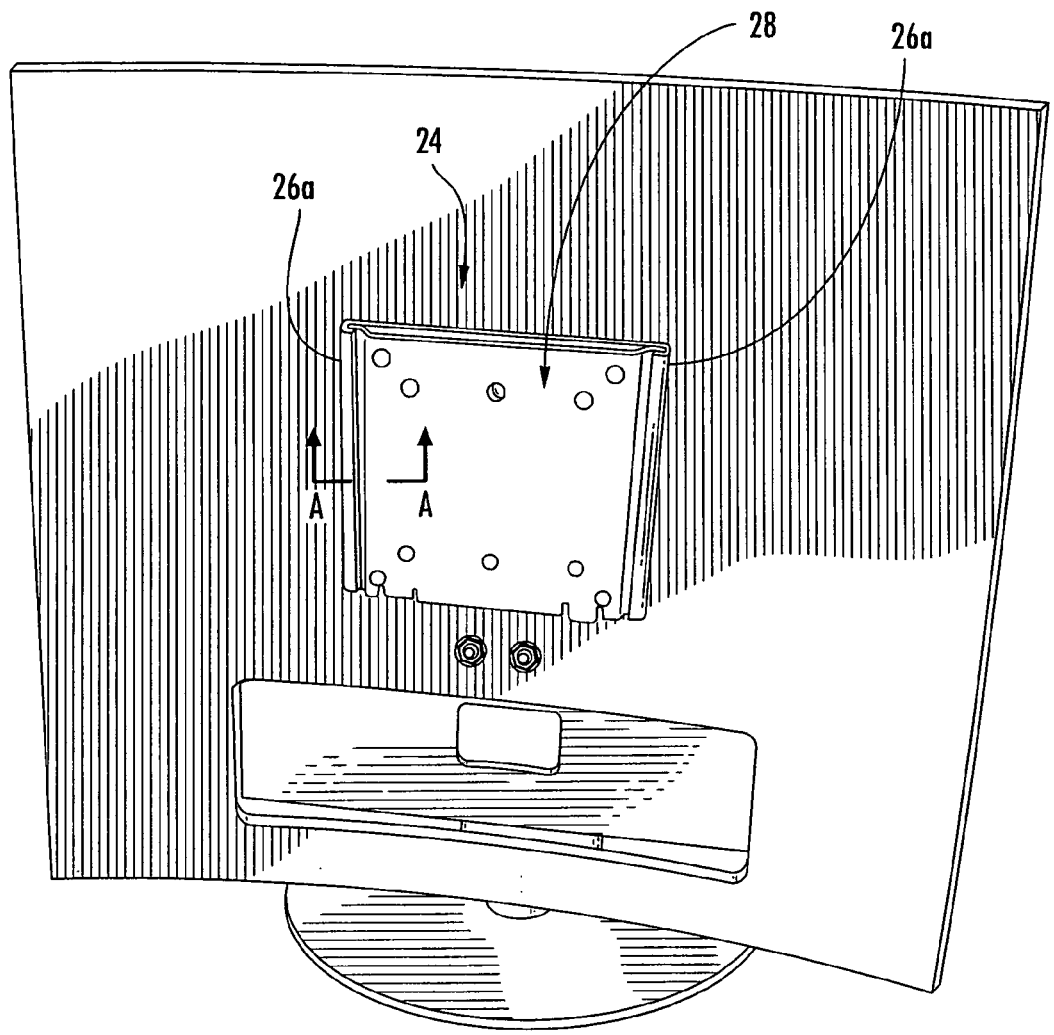
FIG. 11 is a front perspective view of a monitor stand of the present invention, showing the monitor attachment portion of the mounting bracket received in the panel attachment portion of the mounting bracket at the support panel.
Figure 11A:
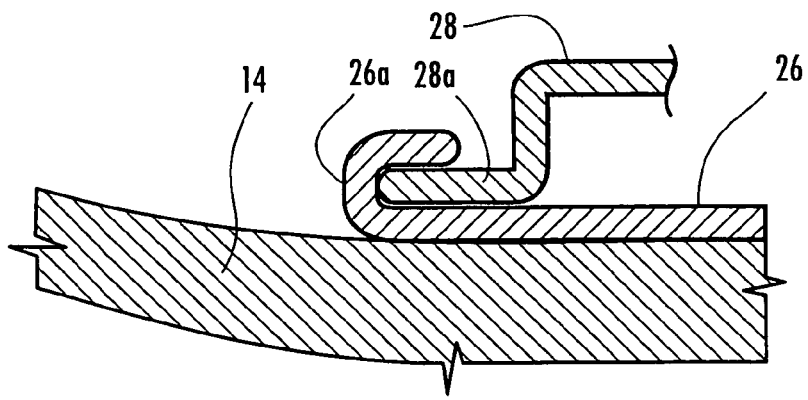
FIG. 11A is a sectional view of the tab and channel engagement of the mounting bracket portions taken along the line A-A in FIG. 11.
Figure 12:
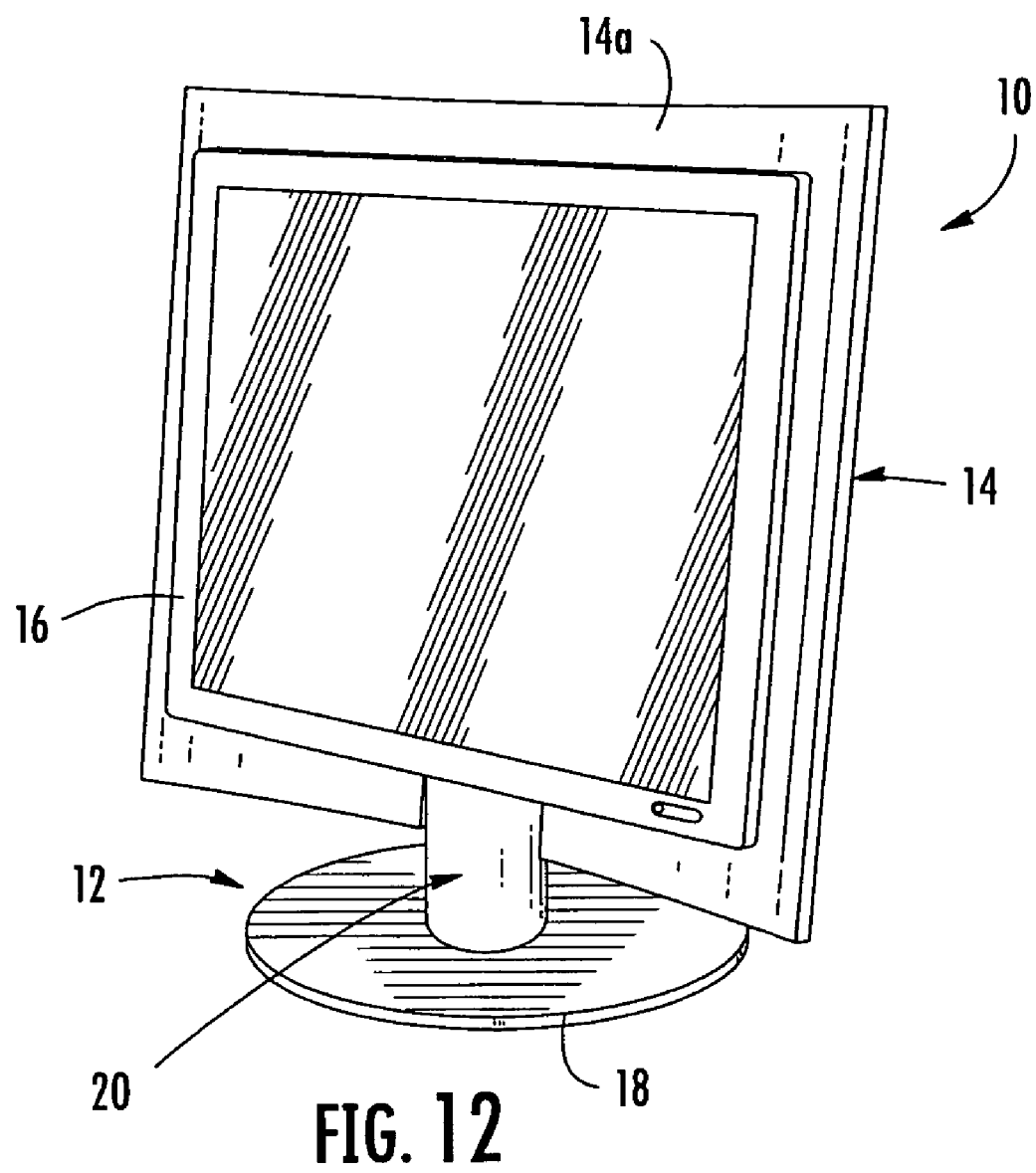
FIG. 12 is a perspective view of another monitor stand, shown supporting a flat panel monitor in accordance with the present invention.

In the illustrated embodiment, the monitor 16 is mountable to the support panel via a mounting bracket 24 (FIGS. 3 and 11A), which includes a panel attachment portion 26 (FIG. 8) and a monitor attachment portion 28 (FIG. 10). As shown in FIG. 3, the bracket spans the gap between the rear surface of the monitor/screen so as to mount the generally flat or planar monitor at the curved support panel, with the outer side portions of the monitor being at or near the front surface of the curved support panel and the middle portion of the monitor being spaced from the curved front surface of the support panel. The panel attachment portion 26 is secured to or mounted or attached at the front surface 14a of support panel 14 (such as via fasteners, such as screws or the like, or via other fastening means, such as adhesive or the like) for mounting or supporting the monitor or display screen at support panel 14. The monitor attachment portion 28 may be secured to the back of the monitor, such as via fasteners or the like.

As best seen with reference to FIGS. 8, 10, 11 and 11A, the attachment portions 26, 28 (such as metallic brackets formed or stamped out of a suitable metallic material, or other suitable material, such as high strength plastic or engineered plastic or the like) of mounting bracket 24 may be secured to the respective structures via fasteners, and then may be secured or retained together without the use of any additional fasteners (such as via sliding together via a tab and channel engagement). For example, the monitor attachment portion 28 may include fasteners or fastener apertures or the like that allow for ready attachment to a variety of different types of computer monitors. Because most computer monitors mount to their associated supports via fasteners in one of only a few different configurations (depending on the manufacturer of the monitor), the monitor attachment portion 28 of bracket 24 may provide various mounting apertures so that the bracket is readily adapted to many or all of the typical monitors that are commercially available. Likewise, the panel attachment portion 26 of mounting bracket 24 may include mounting apertures therethrough for securing the panel attachment portion 26 to the support panel 14 via fasteners, such as screws or the like.

The monitor attachment portion and the panel attachment portion may be formed or configured so as to readily connect together (such as via tabs and slots or the like), so that the monitor attachment portion (and monitor secured thereto) may be readily attached to and supported by the panel attachment portion of the bracket at the support panel 14, without requiring any fasteners to secure the attachment portions together. In the illustrated embodiment (and as can be seen with reference to FIGS. 8, 10, 11 and 11A), the panel attachment portion 26 is formed with grooves or channels 26a along the sides of the attachment portion, with the grooves 26a being tapered or angled inward along the sides and toward each other at the lower end. The distance between the lower ends of the grooves thus is narrower or less than the distance between the upper ends of the grooves. The monitor attachment portion 28 is formed with outwardly extending tabs or flanges 28a, which are also tapered toward each other at the lower ends thereof. Thus, the monitor attachment portion 28 (with the monitor secured thereto) may be readily slid downward at the panel attachment portion 26, with the tabs 28a being received within and along the grooves or channels 26a until the channels limit or substantially preclude further downward movement (due to the inward taper of the channels), whereby the monitor is positioned at the desired or appropriate location at the support panel. The attachment portions of the mounting bracket thus may be secured or fastened to the respective structures, but may be attached to each other to support the monitor at the support panel without the use or need of any additional fasteners or screws or bolts or the like.

The monitor stand of the present invention thus supports a typical computer monitor (such as a liquid crystal display (LCD) flat panel computer monitor) and provides an enhanced, aesthetically pleasing appearance for the monitor. The stand may be supported at a desk or countertop or cabinet and the support panel and monitor may be adjusted about a generally horizontal pivot axis (via the hinge 22) so as to pivot the monitor up and down, and may be adjusted about a generally vertical pivot axis (via the vertical post or arm 20) to pivot the monitor side to side. The stand thus provides adjustment of the monitor relative to the base about two generally orthogonal pivot axes so as to facilitate adjustment of the viewing angle of the monitor to the desired angle of the person using the computer or monitor. The support arm may receive the wires or cables of the computer monitor (such as through the cut-away upper portion of the upper arm portion of the support arm) so that the wires or cables may be routed from behind the monitor (and between the monitor and the support panel) and down through the support arm. The wires or cables may then be routed out through an opening 21 at a lower end of the support arm or may be routed down through the base portion and optionally through an opening in the support surface (such as through an opening in the desk or countertop at which the monitor stand is positioned) beneath the monitor stand. The wires of the monitor thus may be substantially concealed within the monitor stand of the present invention, thereby further enhancing the appearance and functionality of the monitor stand and work station at which it is implemented.

Optionally, and with reference to FIGS. 18-23, a monitor stand or display support 110 may include a support panel 114 (such as a support panel similar to support panel 14 described above) and a support shelf 130 for supporting a computer or the like at the rear of the support panel 114. The support shelf 130 may extend rearward from the rear of the support panel 114 and may be sized and/or shaped to receive and support a computer or CPU or mini-CPU 131 thereon. The monitor stand 110 may include a housing portion 132 along the rear of the support panel and at the support shelf 130 for receiving and routing/managing wires and/or cables of the computer and monitor. The housing 132 may be generally open at the front of the support panel 114 and generally at or encompassing an opening 114b through support panel (for receiving wires/cables from the monitor mounted on the support panel) and may include an opening 132a that opens at the rear of the housing (for receiving or routing wires/cables of the monitor and/or computer). As can be seen with reference to FIGS. 19-21, support shelf 130 may comprise a generally hollow shelf with an opening 130a in the upper shelf or support portion 130b to facilitate wire management of wires/cables from the computer or other electrical accessory or device within the support shelf 130 and to the housing 132 and/or hollow support arm or post 120.

Optionally, the housing 132 may house or contain an electrical outlet or port to allow for electrical connections to be made at the monitor stand. For example, the housing may include an outlet with a wire routed through the housing and through the vertical arm and out the base for plugging the monitor stand into an electrical outlet (such as at a wall or desk or work station), whereby a user may plug the computer that is placed on the support shelf into the outlet of the monitor stand to ease the electrical connection of the computer to a power supply. Similarly, the housing 132 may include other electrical ports or communication ports and associated connectors or wires for connecting the monitor stand to corresponding ports at the wall or desk or work station at which the monitor stand is located, whereby the computer (or keyboard or other component) may be connected to or plugged into the respective port or connector at the monitor stand to ease electrical hook up of the computer and monitor (or other accessory suitable for use at the monitor stand or typically found at a desk or workstation, such as a personal data device or the like).

Because of the additional structure of the support shelf (and any computer or other component or accessory or object supported thereon), the base 112 may be positioned rearward of the support panel 114 for enhanced balance and stability of the monitor stand 110. The support panel 114 thus may be pivotally mounted to the housing 132 via a bracket or hinge or pivot axle 122, so that the support panel may be pivoted about a generally horizontal pivot axis (whereby the support shelf 130 and computer located thereon remain generally horizontal irrespective of the pivot angle of the display or support panel and the monitor about the horizontal pivot axis). The support panel and monitor and the support shelf may all pivot together about the vertical pivot axis, such as in a similar manner as described above. The monitor stand 110 may otherwise be substantially similar to monitor stand 10, discussed above, such that a detailed description of the monitor stands will not be repeated herein. The similar or common components of the monitor stands are shown in FIGS. 18-23 with similar reference numbers as the monitor stand of FIGS. 1-17, but with 100 added to each of the reference numbers.

Optionally, and as shown in FIGS. 30-35, the monitor stand or support 110' may include an upper support shelf 130a' and a lower support shelf 130b' extending rearward from the support panel 114'. The upper support shelf 130a' may support a laptop computer 131' thereon, while the lower support shelf 130b' may support other accessories associated with the computer (such as a keyboard or the like), or may support other objects or devices as may be desired by the user of the monitor stand. The monitor stand 110' includes a wire housing or wire management structure or element that includes an upper housing portion 133a' and a lower housing portion 133b', with each housing portion 133a', 133b' being open or at least partially open at their rearward ends for receiving wires from the laptop or other electrical accessory, and with the front or forward ends of the housing portions being open at the back of the support panel 114'. The support panel 114' includes an opening or aperture or hole 114b' therethrough that encompasses openings at the front end of the housing portions so that wires may be routed through the support panel to the laptop or other accessory on one of the support shelves 130a', 130b'. The support shelves 130a', 130b' may include an opening or hole or aperture 135' (FIG. 31) therethrough for wire management/routing between the housing portions 133a', 133b' and the generally hollow support arm or post 120'. Optionally, one or both of the housing portions may have an electrical outlet or communication port or the like and associated wires or cables or connectors so that the laptop or other accessory may be readily connected to or plugged into the monitor stand to ease the hook up of the laptop or accessory at the monitor stand, such as described above. The monitor stand 110' may otherwise be substantially similar to monitor stand 110, discussed above, such that a detailed description of the monitor stands will not be repeated herein.

Figure 25:
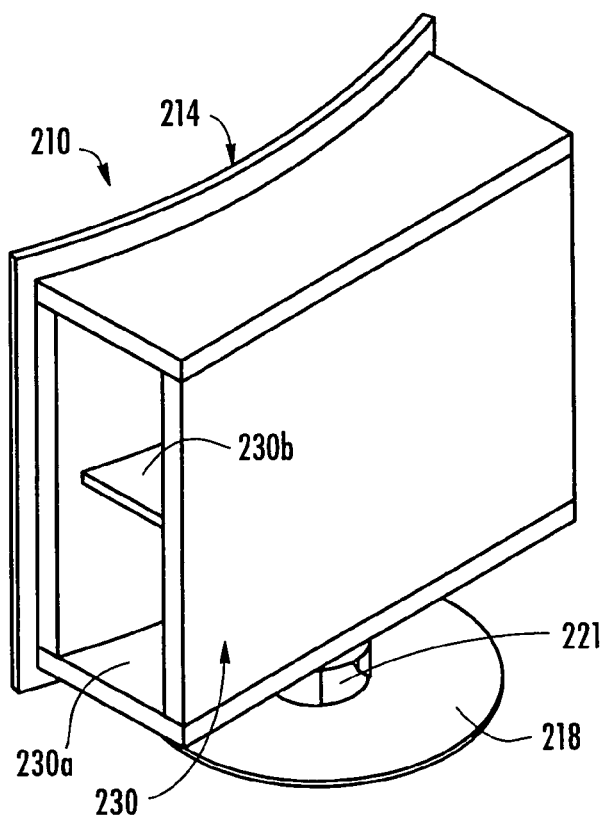
FIG. 25 is a rear perspective view of the monitor stand of FIG. 24.
Figure 26:
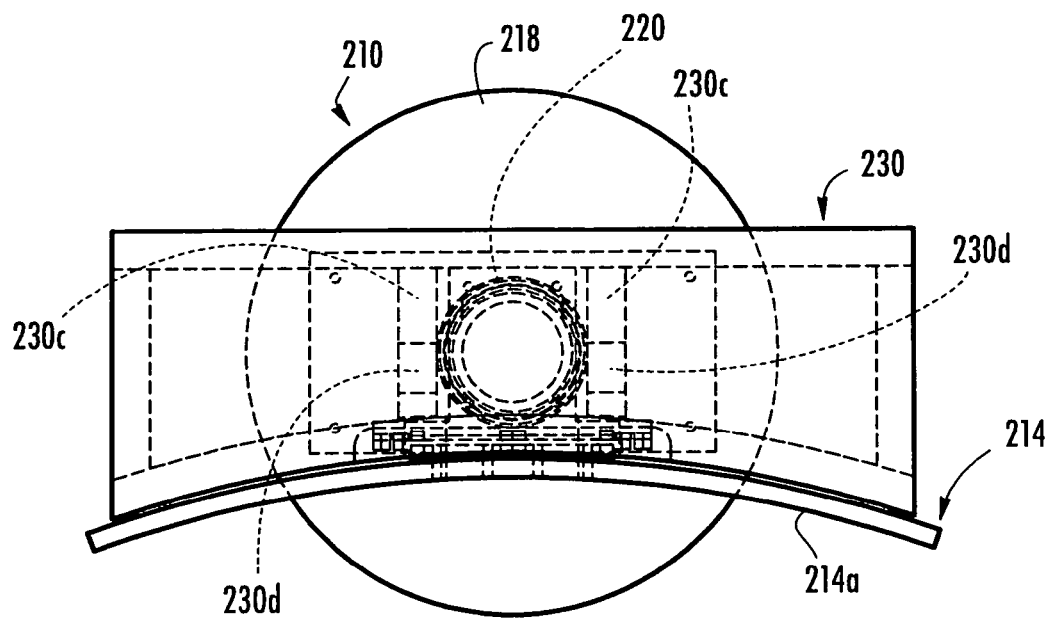
FIG. 26 is a top plan view of the monitor stand of FIGS. 24 and 25, shown without the flat panel monitor supported thereon.
Figure 27:
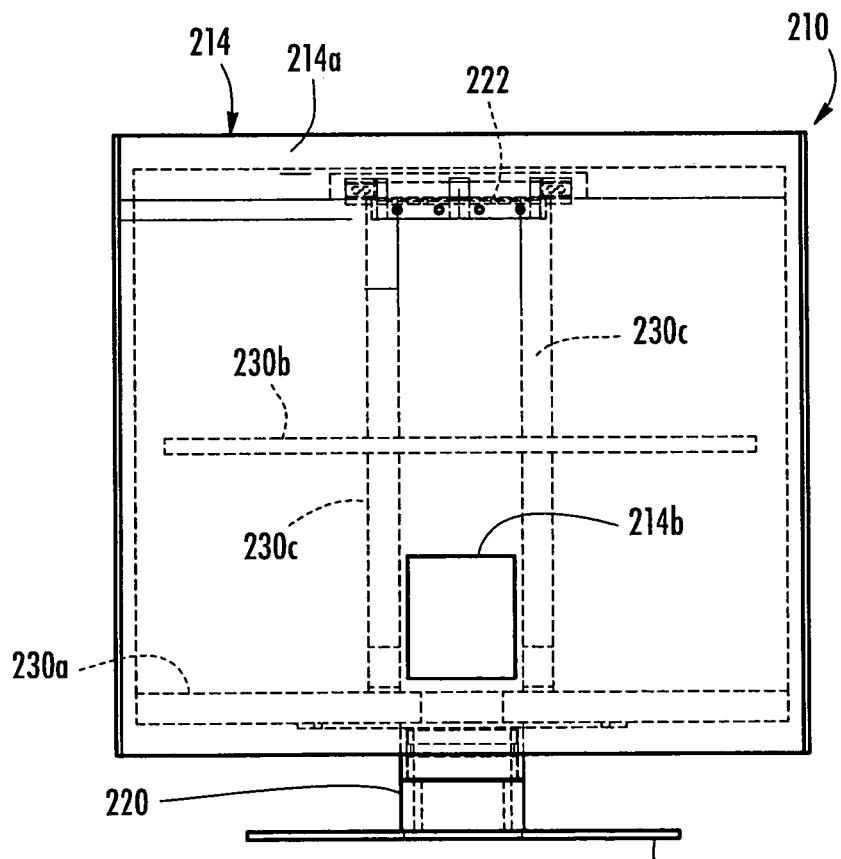
FIG. 27 is a front elevation of the monitor stand of FIGS. 24-26.
Figure 28:
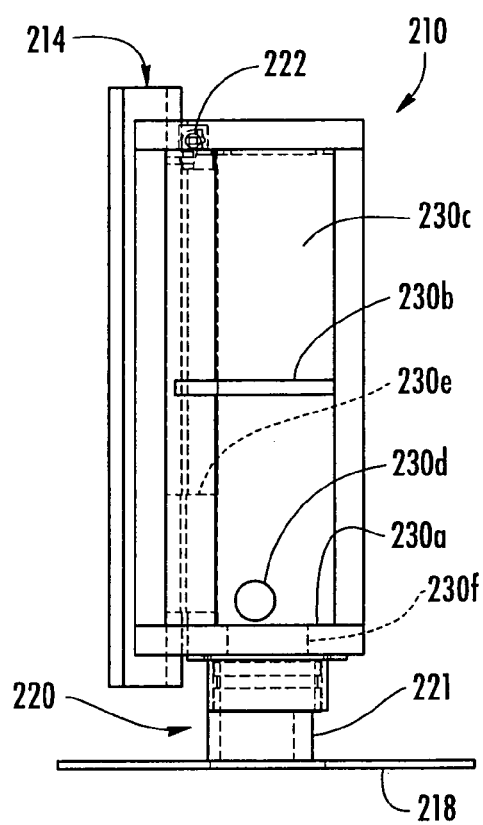
FIG. 28 is a side elevation of the monitor stand of FIGS. 24-27.
Figure 29:
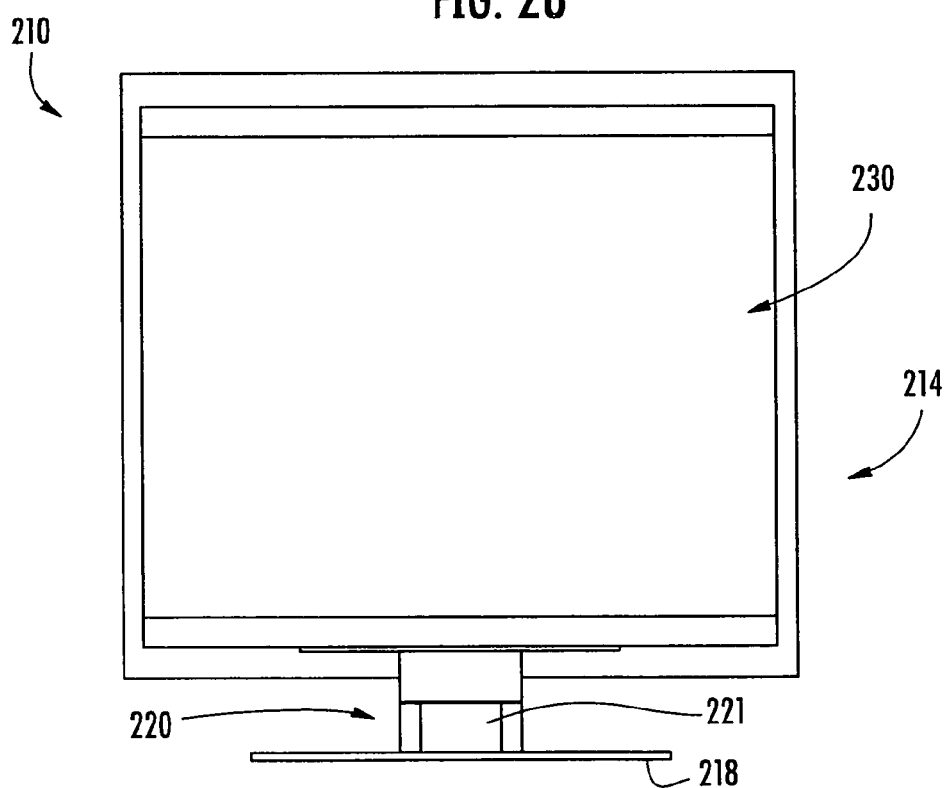
FIG. 29 is a rear elevation of the monitor stand of FIGS. 24-28.
Figure 30:
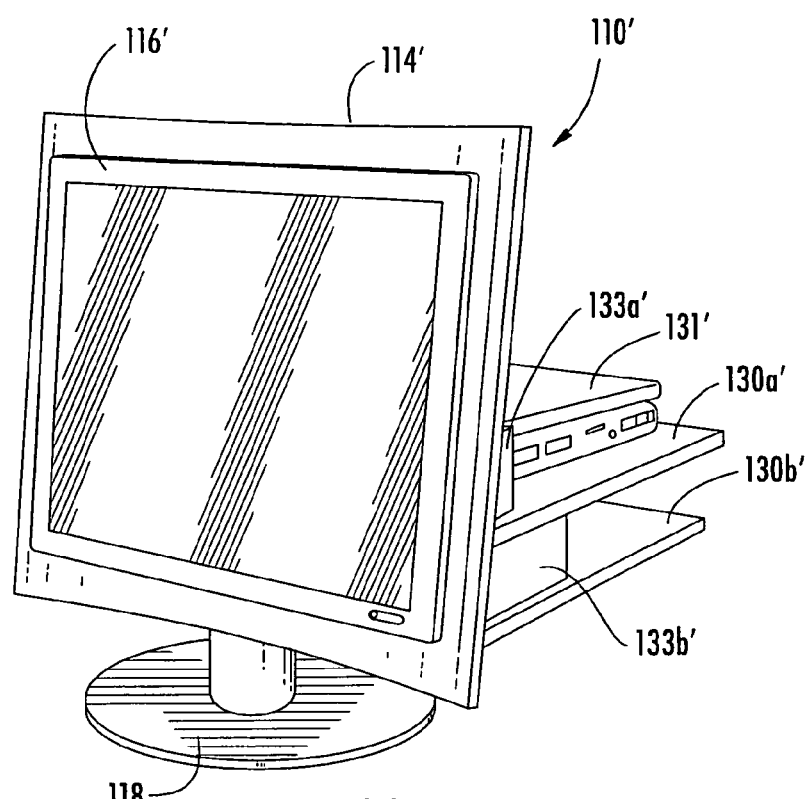
FIG. 30 is a front perspective view of another monitor stand of the present invention, shown supporting a flat panel monitor at a display portion and supporting a laptop computer at a rear portion of the monitor stand.
Figure 31:
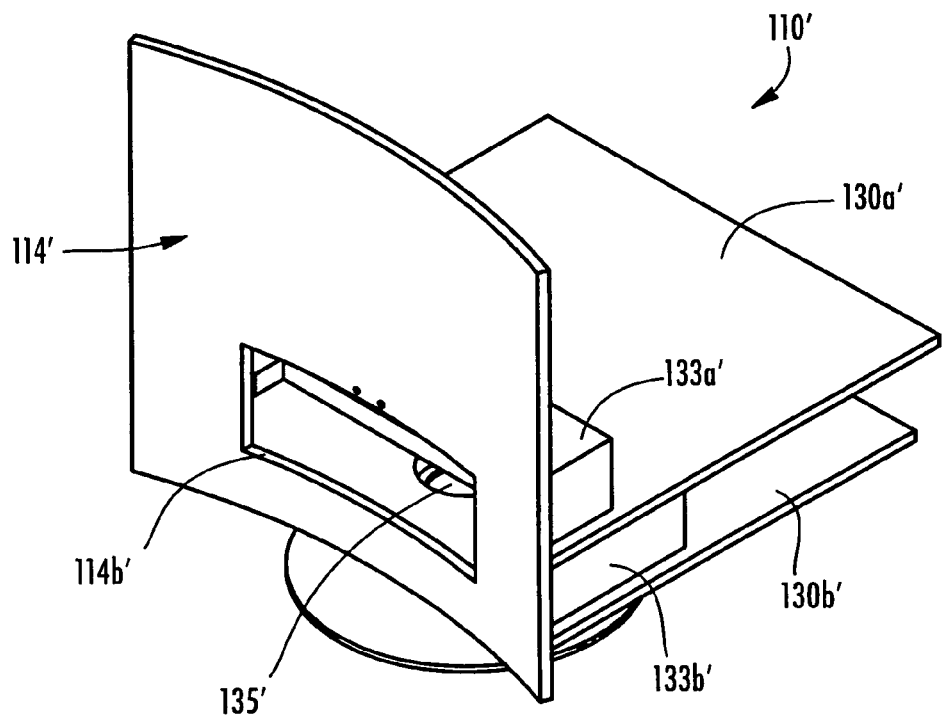
FIG. 31 is another front perspective view of a monitor stand similar to FIG. 30, shown without a flat panel monitor or laptop computer supported thereon.
Figure 32:
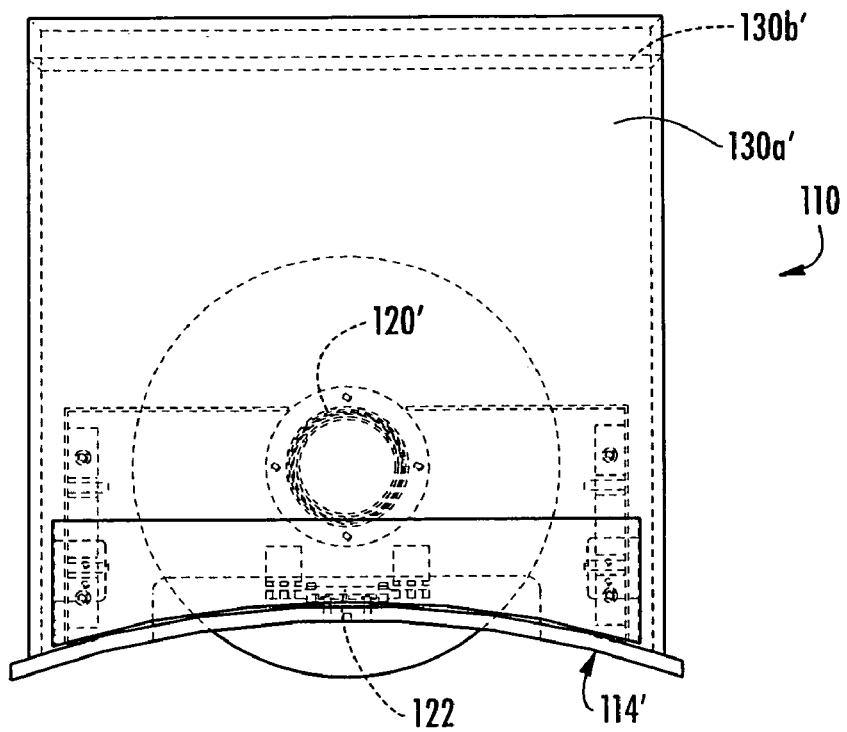
FIG. 32 is a top plan view of the monitor stand of FIG. 31.
Figure 33:
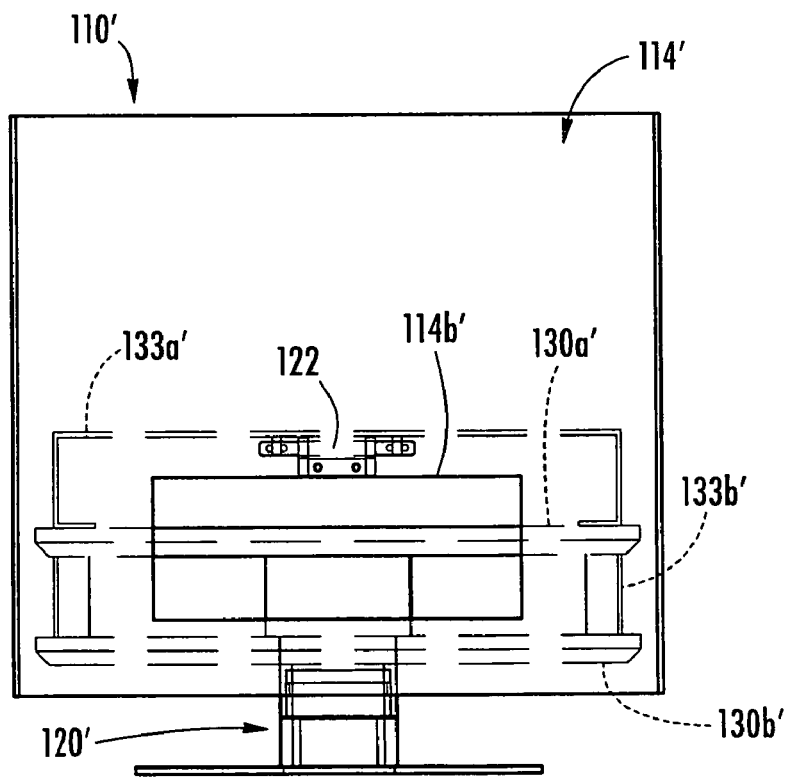
FIG. 33 is a front elevation of the monitor stand of FIGS. 31 and 32.
Figure 34:
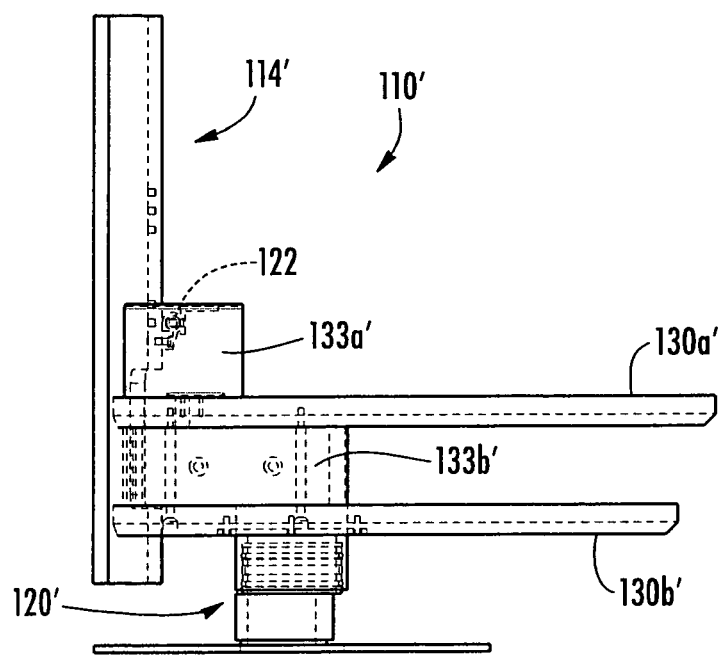
FIG. 34 is a side elevation of the monitor stand of FIGS. 31-33.
Figure 35:
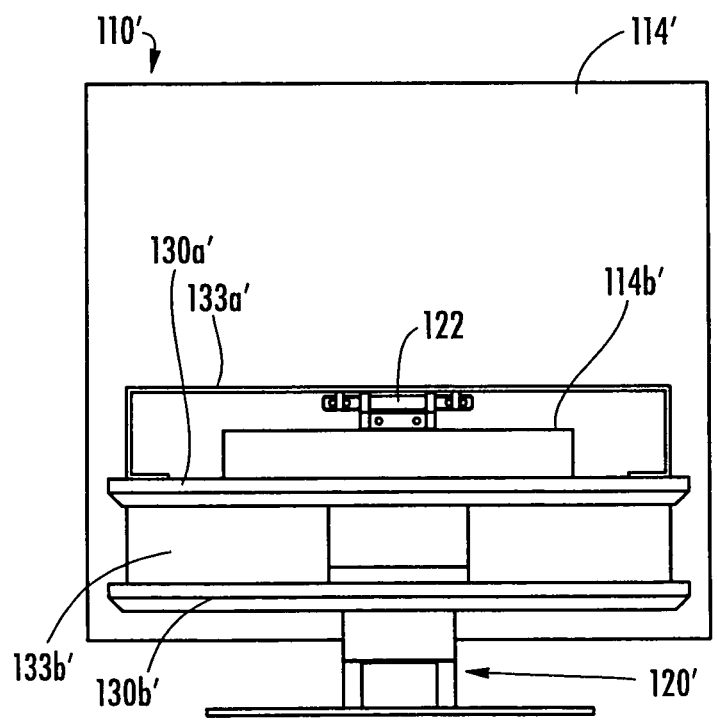
FIG. 35 is a rear elevation of the monitor stand of FIGS. 31-34.

Optionally, and with reference to FIGS. 24-29, a monitor stand or display support 210 may include a support panel 214 (such as similar to support panel 14 described above) and a storage housing or element or structure 230 for supporting or storing items at the rear of the support panel 214. The storage housing 230 may extend rearward from the rear of the support panel 214 and may provide one or more cavities and/or shelves for receiving and supporting various objects or items (such as, for example, a personal data device or the like) at the rear of the support panel. The housing 230 may be generally open at either side and may include one or more generally horizontal shelves 230a, 230b, with generally vertical divider panels 230c to separate the storage shelves at opposite sides of the housing 230 (as best shown in FIG. 27). Housing 230 may also include openings or apertures or ports (such as opening 230d in FIGS. 26 and 28) for routing wires from a personal data device or the like through the hollow support arm 220 and to the computer that is associated with or connected to the monitor supported on the support panel 214. The housing 230 may include an opening 230e that opens at the front of the support panel 214 (and the support panel may include an opening 214b therethrough for routing or managing wires/cables between the monitor mounted on the support panel and the housing) and may include an opening 230f that opens at the bottom panel or shelf 230a of the housing and generally into the hollow support arm or post 220 (such as for routing or managing wires/cables of the monitor and/or computer and/or other electrical accessory or device). Optionally, the housing may include an electrical outlet or communication port or the like and associated wires or cables or connectors so that an accessory or the like may be readily connected to or plugged into the monitor stand to ease the hook up of the accessory at the monitor stand, such as described above.

Similar to monitor stands 110, 110', discussed above, the base portion 212 of monitor stand 210 is positioned rearward of the support panel 214 for enhanced balance and stability of the monitor stand 210. The support panel 214 thus may be pivotally mounted to the housing 230, such as at an upper portion of the housing 230, via a bracket or hinge or pivot axle 222, so that the support panel may be pivoted about a generally horizontal pivot axis to a desired viewing angle while the housing remains generally horizontal. As best shown in FIGS. 25 and 26, the housing 230 may have a curved or arcuate forward panel or edge or portion that is formed to generally correspond with the curved rear surface of the curved support panel 214, in order to provide generally or substantially flush or uniform mating surfaces between the housing 230 and the support panel 214. The monitor stand 210 may otherwise be substantially similar to monitor stand 110, discussed above, such that a detailed description of the monitor stands will not be repeated herein. The similar or common components of the monitor stands are shown in FIGS. 24-29 with similar reference numbers as the monitor stand of FIGS. 1-17, but with 200 added to each of the reference numbers.

Figure 36:
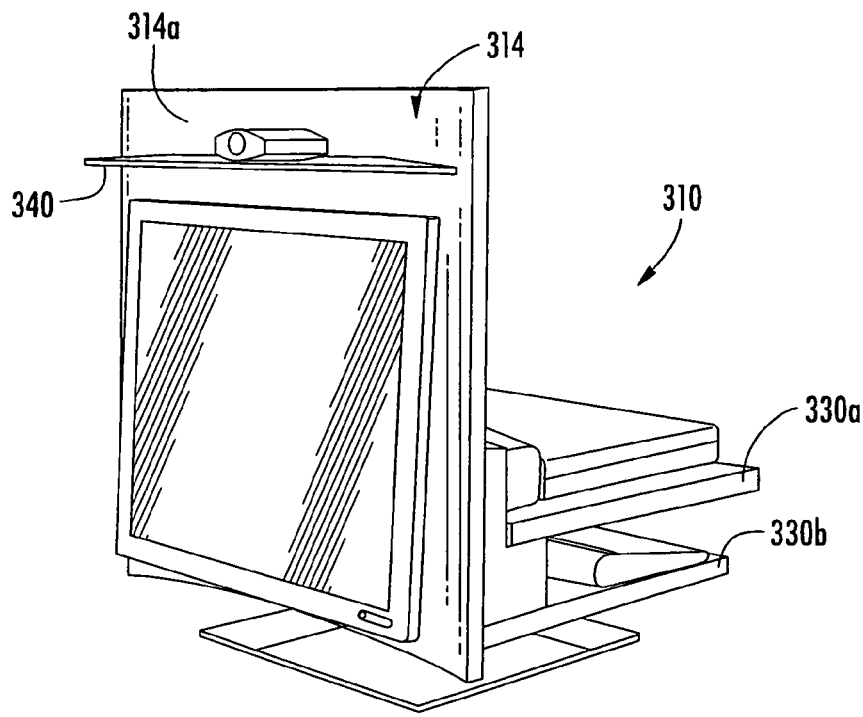
FIG. 36 is a front perspective view of another monitor stand similar to the monitor stand of FIG. 30, with a support shelf at the front of the monitor stand of the present invention.
Figure 37:
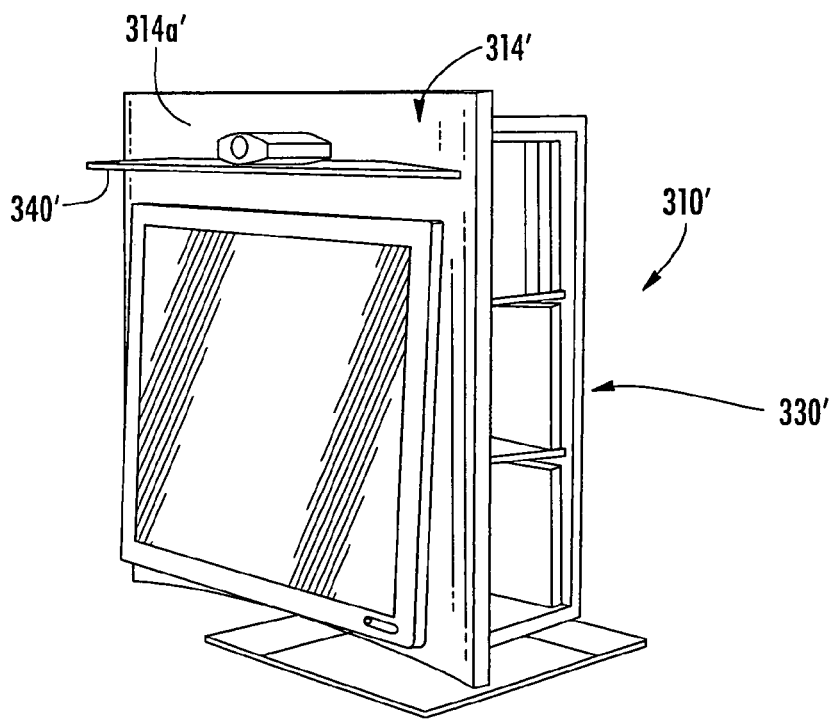
FIG. 37 is a front perspective view of another monitor stand similar to the monitor stand of FIG. 24, with a support shelf at the front of the monitor stand of the present invention.

Optionally, and with reference to FIGS. 36 and 37, a monitor stand 310, 310' may include a curved support panel 314, 314' with a support shelf 340, 340' positioned at and extending forwardly from the front surface of the support panel 314, 314'. The support shelf 340, 340' may have an arcuate or curved rear edge that is formed to correspond to or substantially uniformly engage the front surface 314a, 314a' of the support panel 314, 314' (or the panel may include a slot therein or therethrough for at least partially receiving the support shelf to support the shelf at the panel). The support panel and/or support shelf may include a wire management hole or aperture or passageway therethrough to facilitate routing of wires between the shelf area and the area rearward of the support panel (to allow a user to place an electronic accessory or device at the support shelf). In the illustrated embodiments of FIGS. 36 and 37, the monitor stands 310, 310' may include upper and lower rear support shelves 330a, 330b (such as for a laptop support and the like, such as described above with respect to monitor stand 110') or a storage structure or housing 330' (such as described above with respect to monitor stand 210) or other support structure or elements or the like at the rearward side of the monitor support panel. The monitor stands 310, 310' may otherwise be substantially similar to the monitor stands discussed above, such that a detailed description of the monitor stands will not be repeated herein.

Although shown and described as having a curved support panel, and optionally with one or more horizontal shelves or a storage housing positioned behind the support panel, other types of support panels (such as a generally planar or flat support panel or a support panel with a recess on its front face for at least partially receiving the display screen or monitor or other types/forms of support panels), shelves, housings or storage devices or the like may be implemented with the monitor stand, without affecting the scope of the present invention. The monitor stand or support of the present invention thus may support a computer monitor thereon, and may route the wires and/or cables of the monitor (and optionally of other accessories or devices) through the support panel and through the support arm of the monitor stand or support, so as to substantially conceal the wires and/or cables from view. The monitor stand or support may be configured to readily adapt to and support a typical computer monitor (such as a flat panel display or other types of computer monitors), and provides an enhanced and finished appearance to the monitor.

The monitor stand or support of the present invention thus may function to reclaim space that is typically unused behind conventional monitors, with alternate options available for storing accessories or devices, such as laptops, CDs, DVDs, cell phones, PDAs, mini-CPU towers, keyboards, and/or a flat LCD monitor or panel or the like. For example, a flat panel monitor may be attached to the curved support panel of the monitor stand of the present invention (with the bracket assembly spanning the gap between a center rear portion of the monitor and a center front area of the support panel). With its elegant, clean, design-oriented approach, the freestanding monitor stand of the present invention effectively manages the LCD screen's VGA and power cords. The wires/cables may route through the back of the curved panel, into the rotating support arm or post, and then exit the post's mouse hole or other aperture or hole in the post or in the base portion. Optionally, and in addition to providing support for a LCD flat panel monitor, the monitor stand can be specified with an equipment storage option, such as for storing CDs, DVDs, cell phones, and PDAs and/or the like. A wire management feature may also be present for cell phones and PDAs and/or other electronic devices. Optionally, the monitor stand may include a docking station or device or port for docking such portable hand held devices to assist in charging the devices or downloading data from or data to the devices or the like.

Optionally, the monitor stand may include a CPU or mini-CPU support option, where the monitor stand includes a support shelf located behind the curved panel, in order to accommodate or support a mini-CPU. Again, wire management exists not only for wires and cables of the CPU, but also for the LCD monitor's VGA and power cords. Optionally, the monitor stand may include a laptop option, with two horizontal shelves extending back from the curved panel. The top shelf may support a laptop computer, while the lower shelf offers additional storage, such as for a keyboard and other accessories or devices. The wire management features may again be provided that are similar to other the other monitor stand configurations. Optionally, the monitor stand may include one or more electrical outlets or communication ports or the like and associated wires or cables or connectors so that the monitor stand cables or wires may be plugged into or connected to respective ports or outlets at the wall or desk or work station at which the monitor stand is located, and so that the monitor and/or computer or laptop and/or other accessory disposed at or supported at or docked at the monitor stand may be readily connected to or plugged into the monitor stand to ease the hook up of the monitor and/or computer/laptop and/or accessory at the monitor stand.

Therefore, the present invention provides a monitor stand or display support that supports a computer monitor and provides a finished or enhanced or selected or desired framing around and behind the monitor or display. The monitor stand thus may be highly suited for executive offices or lobbies or home environments, where the user may desire a finished or customized or personalized or matching appearance of the computer monitor, such as one that matches the office furniture or kitchen cabinets or other surrounding structures, or such as one that is selected by the user to provide a particular or desired or customized or personalized appearance. The monitor stand of the present invention may include one or more shelves or recesses or cavities for supporting or storing one or more other accessories or devices or items at the monitor stand, while still providing the desired finished appearance of the monitor and monitor stand.

Changes and modifications to the specifically described embodiments may be carried out without departing from the principles of the present invention, which is intended to be limited only by the scope of the appended claims as interpreted according to the principles of patent law.

The invention claimed is:

1. A monitor stand for supporting a computer monitor, said monitor stand comprising:
   a base comprising a base portion and a support arm extending upward from said base portion; and
   a support panel attached to said support arm, said support panel comprising a curved panel having a curved front surface, said support panel being configured to support a computer monitor at said curved front surface, wherein said curved front surface of said support panel includes a panel attachment portion for attaching a computer monitor to said support panel, the computer monitor being separate from said monitor stand until the computer monitor is attached to said panel attachment portion of said support panel.

2. The monitor stand of claim 1 including a bracket assembly for attaching the computer monitor to said support panel.

3. The monitor stand of claim 2, wherein said bracket assembly comprises said panel attachment portion that is secured to said support panel and a monitor attachment portion that is secured to a computer monitor, said monitor attachment portion attaching to said panel attachment portion without fasteners.

4. The monitor stand of claim 3, wherein said panel attachment portion and said monitor attachment portion slide together via a tongue and groove configuration to attach said monitor attachment portion to said panel attachment portion.

5. The monitor stand of claim 1 including at least one storage shelf extending from a rear surface of said support panel.

6. The monitor stand of claim 5, wherein said at least one storage shelf is configured to support a CPU or a laptop computer thereon.

7. The monitor stand of claim 5, wherein said at least one storage shelf is positioned within a housing that substantially encases said at least one storage shelf.

8. The monitor stand of claim 1, wherein said support panel includes at least one aperture or opening therethrough for routing wires or cables of the computer monitor, wherein said at least one aperture or opening is through said curved front surface of said support panel.

9. The monitor stand of claim 8, wherein said support arm includes at least one passageway therethrough for routing wires or cables of the computer monitor.

10. The monitor stand of claim 1, wherein said support panel is pivotable about a generally horizontal axis relative to said base.

11. The monitor stand of claim 1, wherein said support panel is pivotable about a generally vertical axis relative to said base portion.

12. The monitor stand of claim 1 further comprising a front support shelf positioned at and extending forwardly from said curved front surface of said support panel.

13. A monitor stand for supporting a computer monitor, said monitor stand comprising:
 a base comprising a base portion and a support arm extending upward from said base portion;
 a support panel attached to said support arm, said support panel being configured to support a computer monitor at a front surface thereof; and
 at least one storage shelf extending from a rear surface of said support panel for supporting at least one accessory thereon wherein said support panel comprises a curved panel having a curved front surface.

14. The monitor stand of claim 13 including a bracket assembly for attaching the computer monitor to said support panel.

15. The monitor stand of claim 14, wherein said bracket assembly comprises a panel attachment portion that is secured to said support panel and a monitor attachment portion that is secured to a computer monitor, said monitor attachment portion attaching to said panel attachment portion without fasteners.

16. The monitor stand of claim 15, wherein said panel attachment portion and said monitor attachment portion slide together via a tongue and groove configuration to attach said monitor attachment portion to said panel attachment portion.

17. The monitor stand of claim 13, wherein said at least one storage shelf is configured to support a CPU or a laptop computer thereon.

18. The monitor stand of claim 13, wherein said at least one storage shelf is positioned within a housing that substantially encases said at least one storage shelf.

19. The monitor stand of claim 13, wherein said support panel and said at least one storage shelf include apertures therethrough for routing wires or cables of the computer monitor and an electrical accessory positionable at said at least one storage shelf.

20. The monitor stand of claim 19, wherein said support arm includes at least one passageway therethrough for routing wires or cables of the computer monitor and the electrical accessory.

21. The monitor stand of claim 13, wherein said support panel is pivotable about a generally horizontal axis relative to said base.

22. The monitor stand of claim 13, wherein said support panel is pivotable about a generally vertical axis relative to said base portion.

23. The monitor stand of claim 13 further comprising a front support shelf positioned at and extending forwardly from said front surface of said support panel.

* * * * *